(12) United States Patent
Itoh et al.

(10) Patent No.: US 7,445,345 B2
(45) Date of Patent: Nov. 4, 2008

(54) OPTICAL DISPLAY DEVICE AND PROJECTION-TYPE DISPLAY DEVICE

(75) Inventors: Yoshitaka Itoh, Matsumoto (JP); Shohei Yoshida, Shimosuwa-cho (JP); Shoichi Uchiyama, Suwa-gun (JP); Junichi Nakamura, Shiojiri (JP); Takashi Nitta, Chino (JP); Tsunemori Asahi, Hotaka-machi (JP)

(73) Assignee: Seiko Epson Corporation, Tokyo (JP)

( * ) Notice: Subject to any disclaimer, the term of this patent is extended or adjusted under 35 U.S.C. 154(b) by 257 days.

(21) Appl. No.: 11/013,713

(22) Filed: Dec. 17, 2004

(65) Prior Publication Data

US 2005/0174495 A1   Aug. 11, 2005

(30) Foreign Application Priority Data

Dec. 24, 2003 (JP) ............................. 2003-427208
Feb. 2, 2004 (JP) ............................. 2004-025409
Oct. 13, 2004 (JP) ............................. 2004-299285

(51) Int. Cl.
G03B 21/20 (2006.01)
G03B 21/26 (2006.01)
G03B 21/28 (2006.01)
G02F 1/1335 (2006.01)
H04N 5/74 (2006.01)
G02B 27/14 (2006.01)
G02B 27/12 (2006.01)

(52) U.S. Cl. ............................. 353/102; 353/33; 353/34; 353/37; 353/81; 353/82; 353/84; 353/99; 348/750; 348/757; 348/758; 359/237; 359/634; 359/638; 359/639; 359/640; 359/728; 349/8

(58) Field of Classification Search ............... 353/2, 353/31, 33, 34, 37, 81, 82, 84, 98, 99, 119, 353/102; 348/739, 742, 744, 750, 757; 349/5, 349/7, 8; 359/227, 230, 237, 557, 618, 619, 359/621–623, 629, 634, 638–640, 663, 831, 359/833–837
See application file for complete search history.

(56) References Cited

U.S. PATENT DOCUMENTS 5,172,222 A * 12/1992 Plantier et al. ............ 348/751
5,864,374 A * 1/1999 Ito et al. .................... 348/757
5,978,142 A 11/1999 Blackham et al. .......... 359/618
2002/0118432 A1 * 8/2002 De Vaan et al. ............ 359/245

FOREIGN PATENT DOCUMENTS

EP   1 130 451 A1   9/2001
JP   A 62-125791    6/1987
JP   A 62-169594    7/1987

(Continued)

Primary Examiner—Rochelle-Ann Blackman
(74) Attorney, Agent, or Firm—Oliff & Berridge, PLC

(57) ABSTRACT

A projection-type display device 1 including a light source 10, an optical integrator 20, dichroic mirrors 30 and 35, a reflecting mirror 36, a relay optical system 40, parallelizing lenses 50B, 50G and 50R, liquid crystal light valves 60B, 60G and 60R, incident side lenses 70B, 70G and 70R, a light-synthesizing cross dichroic prism 80, a relay lens 90, an emergent side lens 95, a liquid crystal light valve 100 and a projection lens 110, and liquid crystal light valve 100 is provided in the rear stage of liquid crystal light valves 60B, 60G and 60R.

19 Claims, 20 Drawing Sheets

FOREIGN PATENT DOCUMENTS

| | | |
|---|---|---|
| JP | A-04-240689 | 8/1992 |
| JP | A 6-167690 | 6/1994 |
| JP | A-08-294138 | 11/1996 |
| JP | A-09-329761 | 12/1997 |
| JP | 1 2001-100689 | 4/2001 |
| JP | A-2003-084364 | 3/2003 |
| JP | A 2003-121926 A | 4/2003 |
| WO | WO 02/069030 A2 | 9/2002 |

* cited by examiner

FIG. 9

| CONTROL VALUE | 0 | 1 | 2 | 3 | 4 | 5 |
|---|---|---|---|---|---|---|
| TRANSMISSION FACTOR | 0.003 | 0.006 | 0.009 | 0.012 | 0.017 | 0.025 |
| CONTROL VALUE | 6 | 7 | 8 | 9 | 10 | 11 |
| TRANSMISSION FACTOR | 0.038 | 0.06 | 0.09 | 0.15 | 0.23 | 0.33 |
| CONTROL VALUE | 12 | 13 | 14 | 15 | | |
| TRANSMISSION FACTOR | 0.44 | 0.52 | 0.57 | 0.6 | | |

400

| CONTROL VALUE | 0 | 1 | 2 | 3 | 4 | 5 |
|---|---|---|---|---|---|---|
| TRANSMISSION FACTOR | 0.004 | 0.007 | 0.010 | 0.013 | 0.018 | 0.026 |
| CONTROL VALUE | 6 | 7 | 8 | 9 | 10 | 11 |
| TRANSMISSION FACTOR | 0.04 | 0.07 | 0.10 | 0.16 | 0.24 | 0.35 |
| CONTROL VALUE | 12 | 13 | 14 | 15 | | |
| TRANSMISSION FACTOR | 0.45 | 0.52 | 0.57 | 0.6 | | |

$T_{15} = (T_{11} \times 25 + T_{12} \times 5 + T_{13} \times 5 + T_{14} \times 1)/36$ $T_{19} = (T_{15} \times 1 + T_{16} \times 4 + T_{17} \times 4 + T_{18} \times 16)/25$

OPTICAL DISPLAY DEVICE AND PROJECTION-TYPE DISPLAY DEVICE

BACKGROUND OF THE INVENTION

1. Field of the Invention

The present invention relates to a device that displays an image by modulating light from a light source through a plurality of optical modulation elements, and more particularly, to a optical display device and projection-type display device preferable for realizing enlargement of luminance dynamic range and number of gradations.

The present application claims priority on Japanese Patent Application No 2003-427208 filed on Dec. 24, 2003, Japanese Patent Application No. 2004-4025409 filed on Feb. 2, 2004, and Japanese Patent Application No. 2004-299285 filed on Oct. 13, 2004, the contents of which are incorporated herein by reference.

2. Description of the Related Art

Dramatic improvements have been made in recent years in the image quality of liquid crystal displays (LCD), EL, plasma displays, cathode ray tubes (CRT), projectors and other optical display devices, and performance with respect to resolution and color gamut is being realized that is nearly comparable to human vision characteristics. However, the reproduction range of luminance dynamic range is at best about 1 to $10^2$ nit, while the number of gradations is typically 8 bits. On the other hand the luminance dynamic range that can be visualized all at once by human vision is about $10^{-2}$ to $10^{-4}$ nit, while luminance disunion ability is about 0.2 nit, and when this is converted into a number of gradations, it is said to be equivalent to 12 bits When considering the displayed images of current optical display devices in terms of these vision characteristics, the narrowness of the luminance dynamic range is conspicuous, and due to a lack of gradation of shadowed and highlighted areas, displayed images appear to lack realism and impact.

In addition, in the field of computer graphics (CG) used in movies and video games, there is a growing trend to pursue greater depiction reality by giving a luminance dynamic range and number of gradations that approach human vision to display data (referred to as high dynamic range (HDR) display data). However, due to the lack of performance of optical display devices that display that data, there is the problem in which CG images are unable to adequately demons their inherent expressive capabilities.

Moreover, 16-bit color space is scheduled to be employed in next-generation operating system (OS), resulting in a dramatic increase in the luminance dynamic range and number of gradations as compared with current 8-bit color space. Consqeuently, it is desirable to realize optical display devices capable of taking advantage of 16-bit color space.

Among optical display devices, liquid crystal projectors, digital light processing (DLP, trademark of the TI Corporation) projectors and other projection-type display devices are capable of large-screen display, and are effective devices in terms of reproducing reality and impact of displayed images. In this field, the following proposals have been made to solve the aforementioned problems.

Technology for a high dynamic range projection-type display device is disclosed in, for example, Reference 1 (Japanese Unexamined Patent Application, First Publication No. 2001-100689). This display device is provided with a light source, a second optical modulation element that modulates the luminance of the the wavelength region of the light, and a first optical modulation element that modulates luminance of the wavelength region for each wavelength region of the three primary colors of red, green and blue (RGB) within the wavelength region of the light. In this device, light from the light source forms a desired luminance distribution by modulating with the second optical modulation element, the optical image is then formed on the pixel surfaces of the first optical modulation element to modulate the color, after which the secondary modulated light is projected. Each pixel of the second optical modulation element and first optical modulation element is individually controlled based on a first control value and second control value, respectively, that are detained from HDR display data. The optical modulation elements have a pixel structure or segment structure that allows independent control of the transmission factor, and transmitting modulation elements are used that are capable of controlling the two-dimensional distribution of transmission factor. A typical example of this is a liquid crystal light bulb. In addition, reflecting modulation elements way be used instead of transmitting modulation elements, and a typical example of this is a digital micromirror device (DMD).

The following considers the case of using an optical modulation element having a dark display transmission factor of 0.2% and a bright display transmission facor of 60%. In the case of the optical modulation element alone, the luminance dynamic range is 60/0.2=300. Since the aforementioned projection-type display device of the prior art is equivalent to optically arranging optical modulation elements having a luminance dynamic range of 300 in series, a luminance dynamic range of 300×300=90,000 can be realized. In addition, since the same approach is valid for the number of gradations, a number of gradations in excess of 8 bits can be obtained by optically arranging optical modulation elements having a gradation of 8 bits in series.

However, although it is necessary to increase the partition number (resolution) in the second optical modulation elements to reduce display unevenness, since a large number of optical elements are arranged between the second optical modulation element and first optical modulation element, there was the problem of it being difficult to accurately transit illumination light having a desired light intensity distribution to the first optical modulation element.

In addition, since there is considerable distance between the first and second optical modulation elements in the arrangement of first and second optical modulation elements composed by light crystal light valves, DMD and so forth, abandon of modulated light corresponding to each pixel modulated for luminance in the second optical modulation device ends up increasing in proportion to the aforementioned distance at the stage the light reaches the pixels corresponding to the first optical modulation element. Consequently, although methods have been considered in which a shift in the amount of aberration is allowed by increasing each pixel of the second optical modulation element corresponding to, for example, the aberration caused by the aforementioned distance, when this method is employed, there is the problem in which an increase in the size of the fist optical modulation element cannot be avoided. On the other hand, although a method has also been proposed that corrects the aforementioned aberration by interposing an optical element between the first and second optical modulation elements, this has the problem of resulting in increased device costs due to being unable to avoid increased complexity of the illumination optical system and the use of expensive optical elements.

In addition, since the optical length of the illumination light path of each resolved light after the light is divided into the three primary colors of red, green and blue differs from the resolved light of the other two colors with respect to resolved light of a certain single color, differences in luminance occur between the resolved light attributable to differences in optical path length. These differences in luminance cause color bleeding, color diffusion and so forth in optical images following synthesis of the resolved light.

Therefore, in focusing on the aforementioned problems of the prior art that remain unsolved, the object of the present invention is to provide an optical display device and projection-type display device that are preferable for realizing highly accurate transmission of illumination light, expansion of the luminance dynamic range and high image quality of display images while also making it possible to reduce overall device size.

SUMMARY OF THE INVENTION

In order to achieve the aforementioned object, an optical display device of the first aspect of the present invention is an optical display device that displays an image by modulating light from a light source based on display image data, including: a plurality of fist optical modulation elements that control the light propagation characteristics of light from the light source, a light synthesis unit that synthesizes light from each of the fit optical modulation elements, a second optical modulation element that controls the light propagation characteristics of the synthesized light synthesized by the light synthesis unit, and at least one relay element that transmits on optical image formed on the first optical modulation elements to the second optical modulation element.

In the case of this constitution, the light propagation characteristics of light from the light source can be controlled by a plurality of first optical modulation elements, the light from each of the first optical modulation elements can be synthesized by a light synthesis unit, the light propagation characteristics of synthesized light synthesized by the light synthesis unit can be controlled by the second optical modulation element, and an optical image formed on the first optical modulation elements can be transmitted to the second optical modulation element by at least one relay element.

Thus, since light from a light source is modulated through first and second optical modulation elements, the effect is obtained by which a comparatively high luminance dynamic range and number of gradations can be realized.

In addition, since a second optical modulation element is provided in the rear stage of a light synthesis unit with a relay element interposed in between, the distance between both of these can be shortened, thereby making it possible to reduce the optical aberration during transmission of synthesized light. In other words, since synthesized light from the light synthesis unit can be transmitted to the second optical modulation element at comparatively high accuracy, the effect is obtained by which the accuracy at which the synthesized light forms an image on the second optical modulation element can be improved as compared with the prior art.

Here, light propagation characteristics refer to hose characteristics refer to characteristics that have an effect on the propagation of light, examples of which include light transmission factor, reflection factor, refractive index and other propagation characteristics. This applies similarly in the following optical display device of the third aspect of the present invention.

In addition, any medium can be used for the light source provided it is a medium that generates light, examples of which include light sources incorporated into an optical system in the manner of a lamp, or external light sources such as the sun or an interior light. This applies similarly in the following optical display device of the third aspect of the present invention.

In addition, three light sources corresponding to each of the primary colors of light of red, green and blue may be used, or a single light source may be used hat radiates white light by itself. However, in the case of a using a light source that generates white light, an optical separation unit that divides the white light into the three primary colors is required in order to realize the colors of the display image. This applies similarly in the following optical display device of the third aspect of the present invention.

Furthermore, the relay element may be a sitting optical element (e.g., lens) or a reflecting optical element (e.g., mirror).

Moreover, an optical display device of the second aspect of the present invention is an optical display device of the first aspect of the present invention, wherein a relay optical system that contains the relay element has bilateral telecentricity.

In the case of this constitution, the brightness, tint, contrast and so forth of images formed on the pixel spices of the second optical modulation element can be reliably made to be uniform, thereby making image display quality satisfactory.

In addition, as a result of employing the aforementioned constitution, the tolerance range with respect to the arranged location of the second optical modulation element in the direction of the optical axis can be allowed to be comparatively wide, thereby simplifying the design and constitution and reducing production costs.

On the other hand, in order to achieve the aforementioned object, an optical display device of the third aspect of the present invention is an optical display device that displays an image by modulating light from a light source based on display image data, including: an optical separation unit that divides light from the light source into light of a plurality of different specific wavelength regions, a plurality of first optical modulation elements that respectively control the light propagation characteristics of resolved light from the optical separation unit, a light synthesis unit that synthesizes light from the plurality of first optical modulation elements, a second optical modulation element that controls the light propagation characteristics of the synthesized light synthesized by the light synthesis unit, and at least one relay element that transits an optical image formed on the fist optical modulation elements to the second optical modulation element.

In the case of this constitution, light from the light source can be divided into light of a plurality of different specific wavelength regions among its wavelength components by an optical separation unit, the light propagation characteristics of light of a plurality of different specific wavelength regions from the optical separation unit can be controlled for each specific wavelength region of said light by a plurality of fist optical modulation elements, the light of a plurality of specific wavelength regions for which the light propagation characteristics are controlled can be synthesized by a light synthesis unit, the light propagation characteristics of the synthesized light synthesized by the light synthesis unit can be controlled by a second optical modulation element, and an optical image formed on the first optical modulation elements can be transmitted to the second optical modulation element by at least one relay element.

Thus, since light from a light source can be modulated through first and second optical modulation elements, the effect is obtained by which comparatively high luminance dynamic range and number of gradations can be realized.

In addition, since a second optical modulation element is provided in the rear stage of a light synthesis unit with a relay element interposed in between the distance between both of these can be shortened, thereby making it possible to reduce the optical aberration during transmission of synthesized light. In other words, since synthesis light from the light synthesis unit can be transmitted to the second optical modulation element at comparatively high accuracy, the effect is obtained by which the accuracy at Which the synthesized light forms an image on the second optical modulation element can be improved as compared with the prior art.

Furthermore, the relay element may be a transmitting optical element (e.g., lens) or a reflecting optical element (e g., mirror).

Moreover, an optical display device of the fourth aspect of the present invention is an optical display device of the third aspect of the present invention, wherein a relay optical system that contains the relay element has bilateral telecentricity.

In the case of this constitution, the brightness, tint, contrast and so forth of images formed on the pixel surfaces of the second optical modulation element can be reliably made to be uniform, thereby making image display quality satisfactory.

In addition, as a result of employing the aforementioned constitution, the tolerance range with respect to the arranged location of the second optical modulation element in the direction of the optical axis can be allowed to be comparatively wide, thereby simplifying the design and constitution and reducing production costs.

Moreover, an optical display device of the fifth aspect of the present invention is the optical display device of the third aspect of the present invention, wherein the optical separation unit has an incident surface into which light enters from the light source, and a plurality of emergent surfaces from which each of the resolved light radiates, the light synthesis unit has a plurality of incident surfaces corresponding to each of the emergent surfaces of the optical separation unit, and an emergent surface from which synthesized light radiates, and together with providing a light transmission unit so that resolved light radiated from the emergent surfaces of the optical separation unit is transmitted to the corresponding incident surfaces of the light synthesis unit for each emergent surface of the optical separation unit, and the optical path length of said resolved light is equal or nearly equal to the optical path length of other resolved light, the first optical modulation elements are arranged on each light path of the emergent surfaces of the optical separation unit and the incident surge of the light synthesis unit corresponding to said emergent surfaces.

In the case of this constitution, each resolved light radiated from the optical separation unit can be transmitted to each corresponding incident surface of the light synthesis unit through each of the first optical modulation elements by light transmission unit so that the optical path length of each resolved light is equal or nearly equal to the optical path length of other resolved light.

Thus, since the optical path lengths of light of a plurality of specific wavelength regions from the optical separation unit to the light synthesis unit are equal or nearly equal, the differences in luminance between light of each specific wavelength region transmitted from the plurality of first optical modulation elements to the second optical modulation element can be reduced among colored light, thereby resulting in the obtaining of the effect by which color bleeding, color diffusion and so forth of a transmitted optical image is reduced and image quality can be improved.

Moreover, an optical display device of the sixth aspect of the present invention is the optical display device of the fifth aspect of the present invention, wherein the optical separation unit is composed of a prism having a polyhedron shape containing first through fourth side and in which a film is formed that reflects or transmits light of a specific wavelength region so as to divide light from the light source that has entered from the first side face into three different specific wavelength regions and radiate said resolved light from the second through fourth side faces the light synthesis unit is composed of a prism having a polyhedron shape containing first through fourth side faces and in which a film is formed that reflects or transmits light of a specific wavelength region so as to synthesize light that has entered from the second to for side faces and radiate said synthesized light from the first side face, and the light transmission unit is provided so as to transmit the resolved light respectively radiated from the second through fourth side faces of the optical separation unit to he second through fourth side faces of the light synthesis unit and so that the optical path lengths of the three specific wavelength regions of resolved light are each equal or nearly equal In the case of this embodiment, the resolved light respectively radiated from the second trough fourth side faces of the optical separation unit is transmitted to the second through fourth side faces of the light synthesis unit by the light transmission unit so that the optical path lengths of the the specific wavelength regions of resolved light are equal or nearly equal.

Thus, since the optical path lengths of light of a plurality of specific wavelength regions from the optical separation unit to the light synthesis unit are equal or nearly equal, the differences in luminance between light of each specific wavelength region transmitted from the plurality of first optical modulation elements to the second optical modulation element can be reduced among colored light, thereby resulting in the obtaining of the effect by which color bleeding, color diffusion and so forth of a transmitted optical image is reduced and image quality can be improved.

Moreover, an optical display device of the seventh aspect of the present invention is the optical display device of the fifth aspect of the present invention, wherein the optical separation unit and the light synthesis unit are composed of cross dichroic mirrors in which dichroic mirrors are composed to have an X-shaped cross-section.

In the case of this constitution, since the optical separation unit and light synthesis unit are composed of dichroic mirrors, the effect is obtained by which the optical separation unit and light synthesis unit can be composed comparatively inexpensively.

An optical display device of the eighth aspect of the present invention is the optical display device of the fifth aspect of the present invention, wherein the optical separation unit and light synthesis unit are integrally composed.

In the case of this constitution, since the number of steps in the production process of the optical separation unit and light synthesis unit can be reduced, the effect is obtained by which the optical separation unit and light synthesis unit can be composed comparatively inexpensively.

Moreover, an optical display device of the ninth aspect of the present invention is the optical display device of the first aspect of the present invention wherein, first converging lenses are provided between each of the first optical modulation elements and the light synthesis unit.

In the case of this constitution, the efficiency by which light enters the relay element can be improved for each of the specific wavelength regions of light by the first converging lenses.

In other words, the first converging lenses are lenses that have the function of converging incident light.

Moreover, an optical display device of the tenth aspect of the present invention is an optical display device of the ninth aspect of the present invention, wherein converging lenses that have respectively different characteristics for each of the specific wavelength regions of light are provided for the first converging lenses.

In the case of this constitution, the effect is obtained by which the transmission accuracy of light of each specific wavelength region can be improved by respectively providing a first converging lens having properties suitable for enhancing the efficiency of light entering the relay element according to the properties of the light of each specific wavelength region.

Here, the properties of the first converging lenses include the lens shape, material, curvature and refractive index.

Moreover, an optical display device of the eleventh aspect of the present invention is an optical display device of the first aspect of the present invention, wherein a second converging lens is provided between the relay element and the second optical modulation element.

In the case of this constitution, the distribution of incident angles of synthesized light from the relay element into the second optical modulation element can be adjusted to a suitable angle distribution.

In other words, the second converging lens is a lens having a function that adjusts the distribution of radiation angles of light that has entered the lens.

Moreover, an optical display device of the twelfth aspect of the present invention is an optical display device of the first aspect of the present invention, wherein the distance between the first optical modulation elements corresponding to light, of each specific wavelength region and the second optical modulation element is made to be different for the light of each specific wavelength region.

In the case of this constitution, by adjusting the distance between the first optical modulation elements and the second optical modulation element for the light of each specific wavelength region, the location of the focal point, for example, can be adjusted. Thus the effect is obtained by which optical aberration such as chromatic aberration of magnification can be easily corrected.

Moreover, an optical display device of the thirteenth aspect of the present invention is the optical display device of the first aspect of the present invention, wherein at least one aspherical lens is provided in the light path beyond the first optical modulation elements.

In the case of this constitution, shifts in the location of the focal point of each transmitted light can be corrected by an aspherical lens, thereby obtaining the effect by which the image-forming accuracy of the light can be improved.

Moreover an optical display device of the fourteenth aspect of the invention is an optical display device of the fist aspect of the present invention, wherein at least one achromatc lens is provided in the light path beyond the first optical modulation elements.

In the case of this constitution, shifts in the location of the focal point of each transmitted light can be corrected by an achromatic lens, thereby obtaining the effect by which the image-forming accuracy of the light can be improved.

Here, an achromatic lens refers a lens comprising the lamination of two lenses having difference refractive indices and color dispersions (convex lens and concave lens) that corrects, for example, a shift in the locations of the focal points of two colors (normally red and blue). In other words, since this light has the property of having a different refractive index depending on the wavelength, visible light that has passed through a single lens, for example, forms an image in which blue light having a shorter wavelength appears in the front and red light appears in the back (referred to as "axial chromatic aberration"), resulting in bleeding of the colors of the image. In other words an achromatic lens is preferable for suppressing this color bleeding. Naturally, effects can be obtained similar to those of an achromatic lens or aspherical lens even if the lens provided in the light path beyond the first optical modulation elements is a group lens composed of three or more lenses.

Moreover, an optical display device of the fifteenth aspect of the present invention is an optical display device of the first aspect of the preset invention, wherein the second optical modulation element has a display resolution higher than the display resolution of the first optical modulation elements.

In the case of this constitution, since it is no longer necessary to set a high modulation transfer function (MTF) in the transmission of light from the first optical modulation elements to the second optical modulation element, the effect is obtained by which the cost of optical elements between the first optical modulation elements and the second optical modulation element can be reduced. In addition, since the plurality of first optical modulation elements have lower resolution than the second optical modulation element, the first optical modulation elements can be made smaller than the second optical modulation element thereby allowing the obtaining of the effect by which costs can be reduced accordingly.

Moreover, an optical display device of the sixteenth aspect of the present invention is an optical display device of the first aspect of the present invention, wherein the first optical modulation elements have a display resolution that is higher than the display resolution of the second optical modulation element.

In the case of this constitution, since display image data prepared corresponding to the display resolution of the first optical modulation elements having a higher display resolution than the second optical modulation element during the generation of display image data corresponding to each optical modulation element requires only one round of image processing according to the display resolution of the first optical modulation elements, the effect is obtained by which display image data is generated easily. In other words, a plurality of rounds of image processing would be required for a plurality of first optical modulation elements if the display resolution of the second optical modulation element is higher than that of the fist optical modulation elements. In addition, in the case of applying the present invention to a projection-type display device such as a projector, since the display resolution of the second optical modulation element is lower than that of the first optical modulation element their dimensions can be made to be smaller than those of the first optical modulation element, and since the projection lens and other projection units can be made correspondingly smaller, the effect is obtained by which costs can be reduced.

Moreover, an optical display device of the seventeenth aspect of the present invention is an optical display device of the first aspect of the present invention, wherein the dimensions of the display surfaces (image display regions) of the first optical modulation elements are larger than the dimensions of the display surfaces (image display regions) of the second optical modulation element.

In the case of this constitution, in the case of, for example, applying liquid crystal light valves for the first and second optical modulation elements, the size relationship of the dimensions of the display surface composed of a plurality of pixels in the liquid crystal light valves becomes such that the "display so of the first optical modulation elements>display surfaces of the second optical modulation element", thereby enabling the second optical modulation element to be composed smaller than the first optical modulation elements.

Thus, since a projection lens and other projection units can be made smaller corresponding to the reduced size of the second optical modulation element, the effect is obtained by which costs can be reduced. In addition, the constitution resulting from the aforementioned dimensional relationship of the display surfaces of the first and second optical modulation elements is preferable when the relationship is such that the "resolution of the second optical modulation element<resolution of the first optical modulation element".

Here, display surfaces (image display regions) differ depending on the elements used as optical modulation element and in the case of using liquid crystal light valves, the display surfaces are as defined above. However, in the case of using DMD, the display become reflecting surfaces composed of a plurality of micromirrors. Furthermore, the overall dimensions of the aforementioned display surfaces vary depending on the dimensions and number of the pixels themselves, the dimensions of the aforementioned reflecting surface vary depending on the dimensions and number of micromirrors. This applies similarly in the optical display device of the eighteenth aspect of the present invention described below.

An optical display device of the eighteenth aspect of the present invention is an optical display device of the first aspect of the present invention, wherein the dimensions of the display surfaces (image display regions) in the second optical modulation element are larger than the dimensions of the display surfaces (image display regions) in the first optical modulation elements.

In the case of this invention, in the case of, for example, applying liquid crystal light valves for the first and second optical modulation elements, the size relationship of the dimensions of the display surfaces composed of a plurality of pixels in the liquid crystal light valves become such that the "display surfaces of the second optical modulation element>display surfaces of the first optical modulation elements", hereby enabling the first optical modulation elements to be composed smaller than the second optical modulation element. Thus, since the first optical modulation elements, of which three are required when controlling the transmission characteristics of colored light of the three primary colors of red, green and blue (RGB), for example, can be made to be smaller, their costs can be reduced accordingly. In addition, the aforementioned dimensional relationship of the first and second optical modulation elements is preferable when the relationship is that the "resolution of the first optical modulation elements<resolution of the second optical modulation element".

On the other hand, in order to achieve the aforementioned object, a projection-type display device of the nineteenth aspect of the present invention is provided with an optical display device of the first aspect of the present invention and a projection unit that projects light output from said optical display device.

In the case of the constitution, the effect is obtained by which an optical image that has been formed with high accuracy by the aforementioned optical display device of the first aspect of the present invention can be projected onto a screen and so forth to display an image.

BRIEF DESCRIPTION OF THE DRAWINGS

FIG. 9 is a drawing showing the data structure of a control value registration table 400.

DETAILED DESCRIPTION OF THE INVENTION

The following provides an explanation of embodiments of the present invention based on the drawings.

First Embodiment

FIGS. 1 through 16 are drawings showing a first embodiment of an optical display device and projection-type display device of the present invention.

Figure 1:
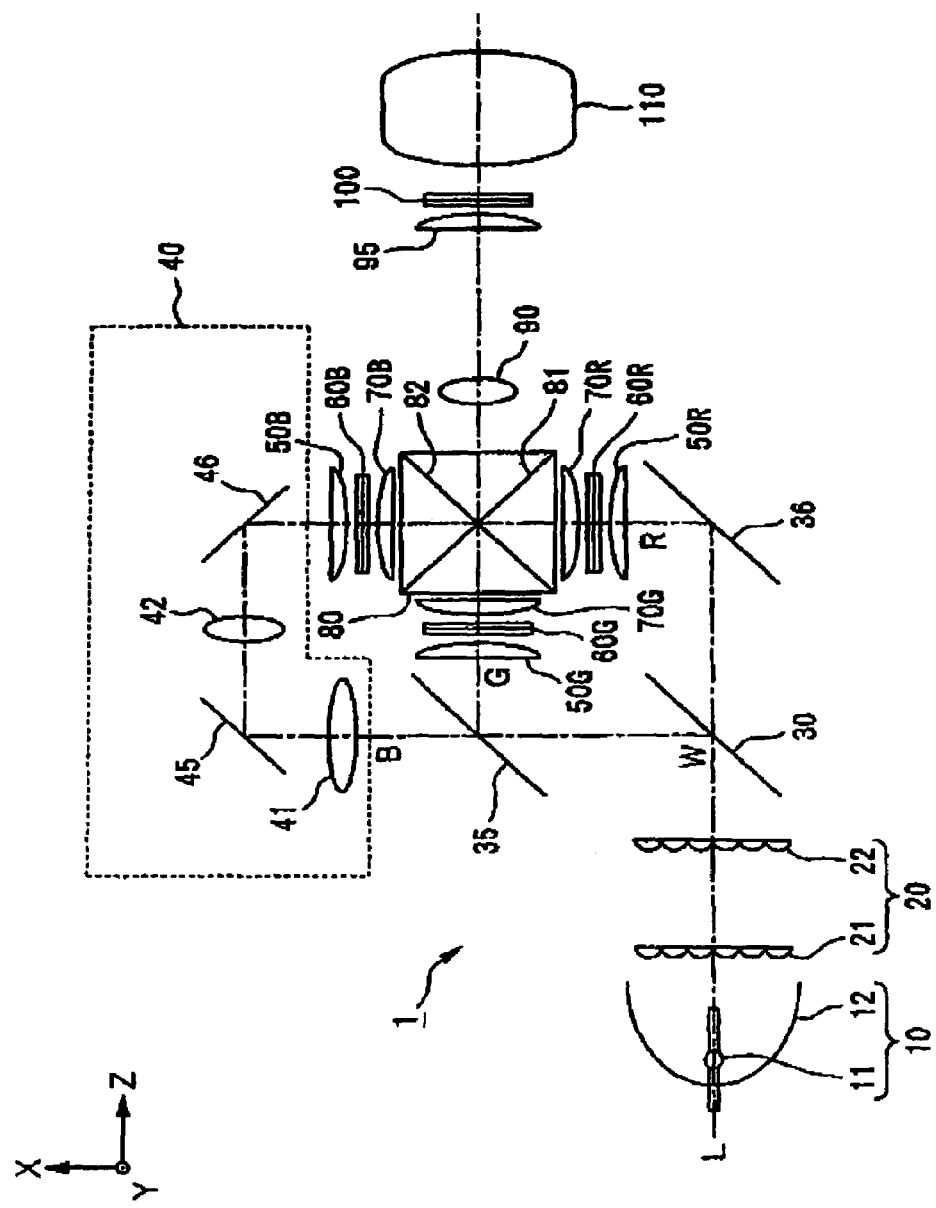
FIG. 1 is a drawing showing the main optical configuration of a projection-type display device as claimed in the present invention.
Figure 2:
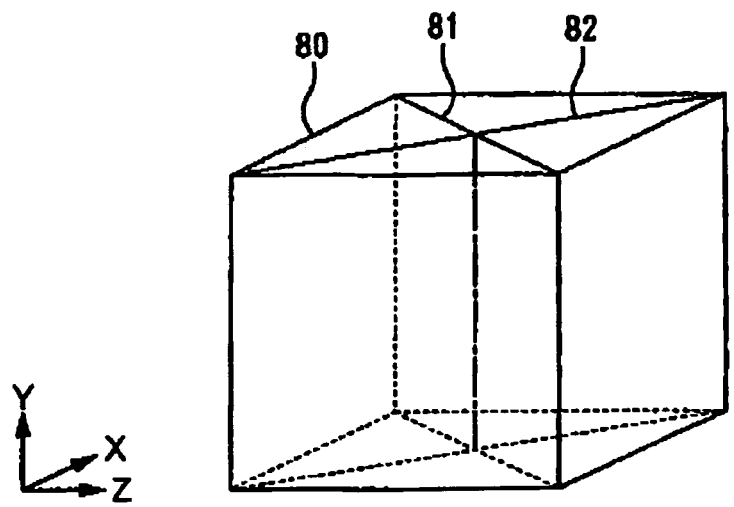
FIG. 2 is a drawing showing the constitution of a dichroic prism 80.
Figure 3:
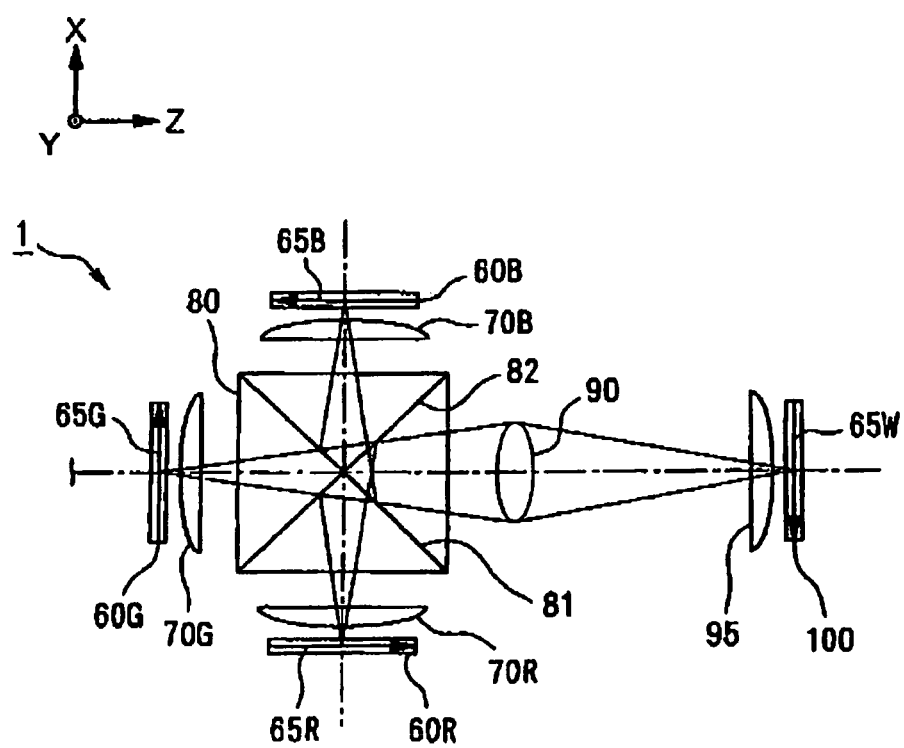
FIG. 3 is a drawing showing an example of a relay optical system that transmits an optical image at 1:1 magnification.

First, an explanation of the constitution of a projection-type display device 1 of a first embodiment of the present invention is provided based on FIGS. 1 through 3. FIG. 1 is a drawing showing the main optical configuration of projection-type display device 1 of the present invention, FIG. 2 is a drawing showing the constitution of a dichroic prism 80, and FIG. 3 is a drawing showing an example of a relay optical system that transmits an optical image at 1:1 magnification.

As shown in FIG. 1, projection-type display device 1 includes a light source 10, an optical integrator 20, dichroic mirrors 30 and 35, a reflecting mirror 36, a relay optical system 40, parallelizing lenses 50B, 50G and 50R, liquid crystal light valves 60B, 60G and 60R, incident side lenses 70B, 70G and 70R, a light-synthesizing cross dichroic prism 80, a relay lens 90, an emergent side lens 95, a liquid crystal light valve 100 and a projection lens 110.

Light source 10 is composed of a light source lamp 11 composed of a high-pressure mercury lamp, xenon lamp or other lamp, and a reflector 12 that converges light from the light source.

Optical integrator 20 is composed of a first lens array 21 and second lens array 22 composed of fly-eye lenses and so forth, and is for obtaining a uniform illumination distribution on the irradiated surface by dispersing luminance unevenness of light source 10.

Dichroic mirror 30 has a dichroic film formed on a glass substrate that has the property of reflecting blue and green light but allowing red light to pass through, and reflects blue and green light but allows red light contained in white light from light source 10 to pass through.

Dichroic mirror 35 has a dichroic film formed on a glass substrate that has the property of reflecting green light but allowing blue light to pass through. It reflects green light among the green and blue light that has passed through dichroic mirror 30 and transmits it to parallelizing lens 50G, but allows the blue light to pass through and be transmitted to relay optical system 40.

Reflecting mirror 36 reflects the red light that has passed through dichroic mirror 30 and transmits it to parallelizing lens 50R.

Relay optical system 40 is composed of an incident light lens 41, a relay lens 42 and reflecting mirrors 45 and 46.

Relay lens 42 transmits light(light intensity distribution) in the vicinity of incident side lens 41 to the vicinity of parallelizing lens 50B, and incident side lens 41 has the function of allowing light to efficiently enter relay lens 42. Blue light that has entered incident side lens 41 is transmitted by this relay optical system 40 to a liquid crystal light valve 60B located spatially at a distance while nearly completely maintaining its intensity distribution and without being accompanied by hardly any optical loss.

Parallelizing lens 50B roughly parallelizes the blue light transmitted by reflecting mirror 46 and radiates it towards liquid crystal light valve 60B.

Parallelizing lens 50G roughly parallelizes the green light transmitted by dichroic mirror 35 and radiates it towards liquid crystal light valve 60G.

Parallelizing lens 50R roughly parallelizes the red light transmitted by reflecting mirror 36 and radiates it towards liquid crystal light valve 60R.

The aforementioned three parallelizing lenses 50B, 50G and 50R have the function of roughly parallelizing each colored light that enters the corresponding liquid crystal light valves 60B, 60G and 60R to narrow the angle distribution of the incident light and improve the display characteristics of liquid crystal light valves 60B, 60G and 60R.

Liquid crystal light valve 60B has a constitution in which a plurality of pixels allowing independent control of a transmission factor are arranged in the form of a matrix, optically modulates blue light that has entered after being roughly parallelizes by parallelizing lens 50B based on display image data, and radiates modulated light that has connoted an image.

Liquid crystal light valve 60G has a constitution in which a plurality of pixels allowing independent control of a transmission factor are arranged in the form of a matrix, optically modulates green light that has entered after being roughly parallelized by parallelizing lens 50G based on display image data, and radiates modulated light that has connoted an image.

Liquid crystal light valve 60R has a constitution in which a plurals of pixels allowing independent control of a transmission factor are in the form of a matrix, optically modulates red light that has entered after being roughly parallelized by parallelizing lens 50R based on display image data, and radiates modulating light that has connoted an image.

Since incident side lenses 70B, 70G and 70R have the function of allowing each color of modulated light modulated by each corresponding liquid crystal color valve 60B, 60G and 60R to efficiently enter relay lens 90, and allow each modulated light to enter relay lens 90 through light-synthesis cross dichroic prism 80.

As shown in FIG. 2, light-synthesizing cross dichroic prism 80 has a hexahedron shape composed by joining four triangular column-shaped prisms, and a blue light reflecting dichroic film 81 and a red light reflecting dichroic film 82 are arranged inside in the form of an X-shaped cross-section. Blue light and red light that have entered are reflected towards the side of relay lens 90 with the corresponding dichroic film. On the other hand, green light that has entered it allowed to pass through to the side of relay lens 90, thereby synthesizing the three primary colors of red, green and blue (RGB) and radiating the synthesizing light to the side of relay lens 90. Here, in order to reduce optical aberration, light-synthesizing cross dichroic prism 80 arranged in the course of light transmission is preferably formed from an optical material having a low level of dispersion (such as zero-dispersion or low-dispersion on glass).

Relay lens 90 has the function of accurately transmitting the three optical images (light intensity distribution) formed on the display surfaces of the liquid crystal light valves 60B, 60G and 60R at three locations onto the display surfaces of a liquid crystal light valve 100 to be described later after passing through an emergent side lens 95 while synthesizing with light synthesizing cross dichroic prism 80 at an intermediate location and while nearly completely main their intensity distribution and without being accompanied by hardly any optical loss, and radiates the synthesized light from light-synthesizing cross dichroic prism 80 towards emergent side lens 95.

Emergent side lens 95 roughly parallelizes the synthesized light guided by relay lets 90 and radiates it towards liquid crystal light valve 100. Since the display characteristics of liquid crystal light valve 100 and projection lens 110 arranged in the rear stage of emergent side lens 95 are dependent on the incident angle of the light, emergent side lens 95 is arranged for the purpose of improving display performance and light utilization efficiency by suppressing any spread in the angle distribution of the light that enters their optical element. Thus, emergent side lens 95 may be omitted depending on the optical elements provided beyond emergent side lens 95.

Liquid crystal light valve 100 has a constitution in which a plurality of pixels allowing independent control of a transmission factor are arranged in the form of a matrix, optically modulates synthesized light extending over all wavelength regions from emergent side lens 95 based on display image data, and radiates modulated light that has connoted the final optical image.

Projection lens 110 displays the optical image formed on the display surfaces of liquid crystal light valve 100 in color by projecting onto a screen not shown.

Here, liquid crystal light valves 60B, 60G, 60R and 100 are active matrix type liquid crystal display elements having a glass substrate in which pixel electrodes, thin film transistor elements, thin film diodes and other switching elements for driving them are formed into a matrix, a glass substrate in which a common electrode is formed over its entire surface, and TN liquid crystal sandwiched between them, with polarizing plates being arranged on both sides of their outer surfaces. They are able to modulate the intensity of light that passes through the liquid crystal light valve by changing the transmission factor according to a control value (applied voltage). For example, they may be in a white/bright (transmitting) stage when a voltage is applied or in a black/dark (non-transmitting) state when a voltage is not applied, and gradations in between are controlled by analog control corresponding to a given control value (applied voltage). Although liquid crystal light valves 60B, 60C, 60R and 100 are the same with respect to connoting an optical image corresponding to the degree of modulation by modulating the intensity of transmitted light, in contrast to the latter liquid crystal light valve 100 modulating light over the entire wavelength region (white light), the former liquid crystal light valves 60B, 60G and 60R are different in that they modulate light of a specific wavelength region (color light such as red, green or blue) that has been resolved with an optical separation unit in the form of dichroic mirrors 30 and 35. Thus, the light intensity modulation performed by liquid crystal light valves 60B, 60G and 60R will be referred to as color modulation, while the light intensity modulation performed by liquid crystal light valve 100 will be referred to as luminance modulation to distinguish the two types for the sake of convenience. In addition, from a similar viewpoint, liquid crystal light valves 60B, 60G and 60R may be referred to as color modulation light valves, while liquid crystal light valve 100 may be referred to as a luminance modulation light valve in order to distinguish them. The contents of the control data input to the color modulation light valves and luminance modulation light valve will be described later in details. Furthermore, in the present embodiment, the color modulation light valves are presumed to have a higher resolution than the luminance modulation light valve, and accordingly, the color modulation light valves are presumed to define the display resolution (resolution as perceived by a viewer when a viewer has viewed an optical image on projection-type display device 1). Naturally, the relationship between display resolutions is not limited to this, but rather a constitution may also be employed in which the luminance modulation light valve determines the display resolution.

Next, an explanation is provided of the overall flow of light transmission of projection-type display device 1. White light from light source 10 is divided into the three colors of red (R), green (G) and blue (B) by dichroic mirrors 30 and 35, and then enters liquid crystal light valves 60B, 60G and 60R (color modulation light valves) through parallelizing lenses 50R and 50G, relay optical system 40 and parallelizing lens 50B. Each colored lift that has entered liquid crystal light valves 60B, 60G and 60R is color-modulated based on external data corresponding to the respective wavelength region, and is radiated as modulated light that has connoted an optical image. Each of the modulated light from liquid crystal light valves 60B, 60G and 60R enters dichroic prism 80 through respective incident side lenses 70B, 70G and 70R, where they are synthesizing into a single beam of light that enters liquid crystal light valve 100 after passing through relay lens 90 and emergent side lens 95. The synthesized light that has entered liquid crystal light valve 100 is luminance modulated based on external data corresponding to the entire wavelength region, and then radiated to projection section 110 as modulated light that has connoted the final optical image. In projection section 110, the desired image is displayed by projecting the final synthesized light from liquid crystal light valve 100 onto a screen not shown.

In projection-type display device 1, a form is employed in which a final display image is formed with a second optical modulation element in the form of liquid crystal light valve 100 by using modulated light that has formed optical images (images) with first optical modulation elements in the form of liquid crystal light valves 60B, 60G and 60R, and realizes the formation of a display image having superior gradation expression (having a high luminance dynamic range) as a result of this two-stage image forming process. Thus, it is necessary to transmit the optical images (images) formed with liquid crystal light valves 60B, 60G and 60R accurately and with high efficiency on liquid crystal light valve 100. In order to accomplish this, it is effective to add an achromatic lens or aspherical lens to a light transmission system that is composed by containing incident side lenses 70B, 70G and 70R, relay lens 90 and emergent side lens 95, or apply achromatic lenses and aspherical lens for incident side lenses 70B, 70G and 70R, relay lens 90 and emergent side lens 95. Moreover, the material, lens curvature and other optical characteristics of incident side lenses 70B, 70G and 70R may be individually optimized. As a result of employing such a constitution, the occurrence of optical aberration in the optical image (image) transmission process can be inhibited, and highly accurate and efficient transmission of optical images (images) can be realized, Furthermore, in the case of making the resolutions and dimensions of liquid crystal light valves 60B, 60G and 60R and liquid crystal light valve 100 to be mutually the same, a really optical system composed of incident side lenses 70B, 70G and 70R, relay lens 90 and emergent side lens 95 should have 1:1 magnification. In the case of using a relay optical system having 1:1 magnification, as shown in FIG. 3, optical images formed on liquid crystal light valves 60B, 60G and 60R are accurately transmitted to liquid crystal light valve 100 without changing in size even if inverted (in the form of inverted images of 1:1 magnification). Furthermore, the aforementioned relay optical system preferably has bilateral telecentricity.

Figure 4:
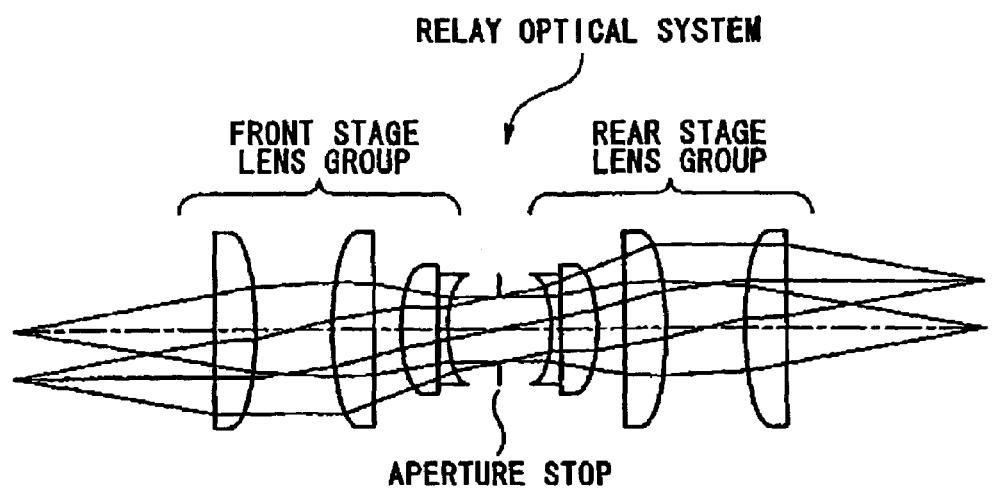
FIG. 4 is a drawing showing an example of the constitution of a relay optical system having bilateral telecentricity.

Here, FIG. 4 is a drawing showing an example of the constitution of a relay optical system having bilateral telecentricity.

As shown in FIG. 4, the relay optical system is an equal magnification imaging lens group composed of a front stage lens group and rear stage lens group arranged nearly symmetrically about an aperture stop. The front stage lens group and rear stage lens group are composed of a plurality of convex lenses and a single concave lens. However, the shape, size, interval, quantity, telecentricity, magnification and other characteristics of the lenses an be suitably altered according to the required characteristics, and are not limited to the example shown in FIG. 4.

Figure 5:
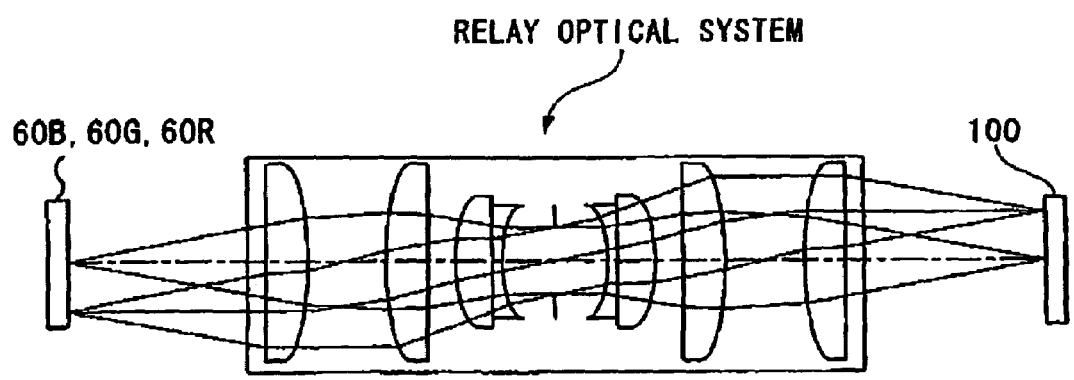
FIG. 5 is a drawing showing the operating principle of the relay optical system of FIG. 4.

FIG. 5 is a drawing showing the operating principle of the relay optical system of FIG. 4.

As shown in FIG. 5, since an equal magnification imaging is typically used for the relay optical system even if the pixel densities of liquid crystal light valves 60B, 60G, 60R and 100 are to be the same, the pixels of liquid crystal light valves 60B, 600 and 60R and liquid crystal light valve 100 can be made to correlate 1:1. in addition, since the relay optical system is composed of a large number of lenses, correction of aberration is satisfactory, and the luminance distribution formed with liquid crystal light valves 60B, 60G and 60R can be accurately transmitted to liquid crystal light valve 100.

Figure 6A:
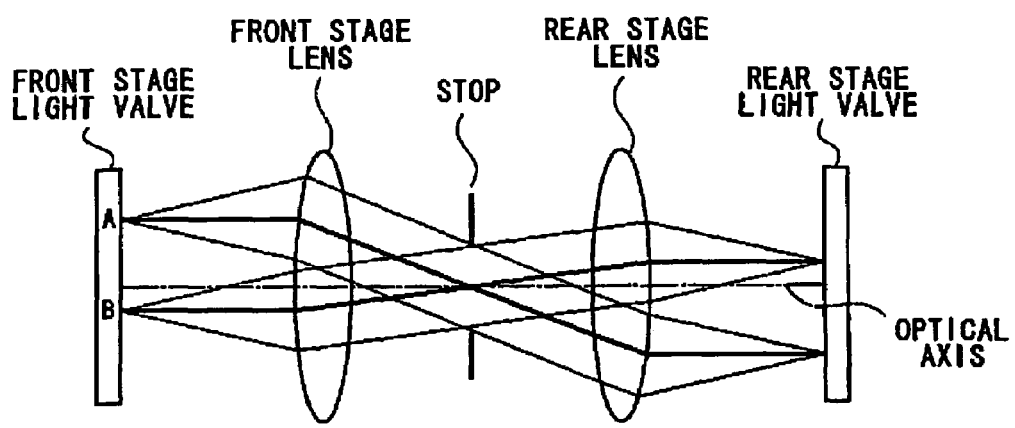
FIG. 6A is a drawing showing a relay optical system having bilateral telecentricity.
Figure 6B:
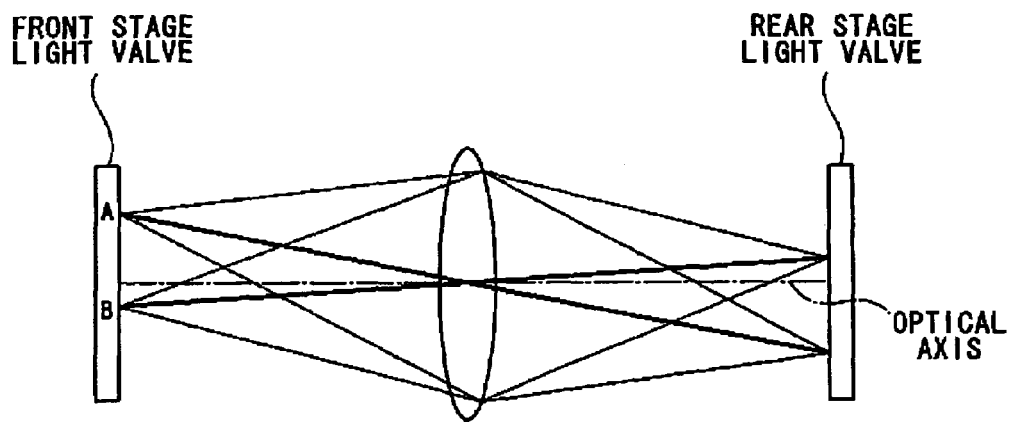
FIG. 6B is a drawing showing a typical relay optical system.
Figure 7A:
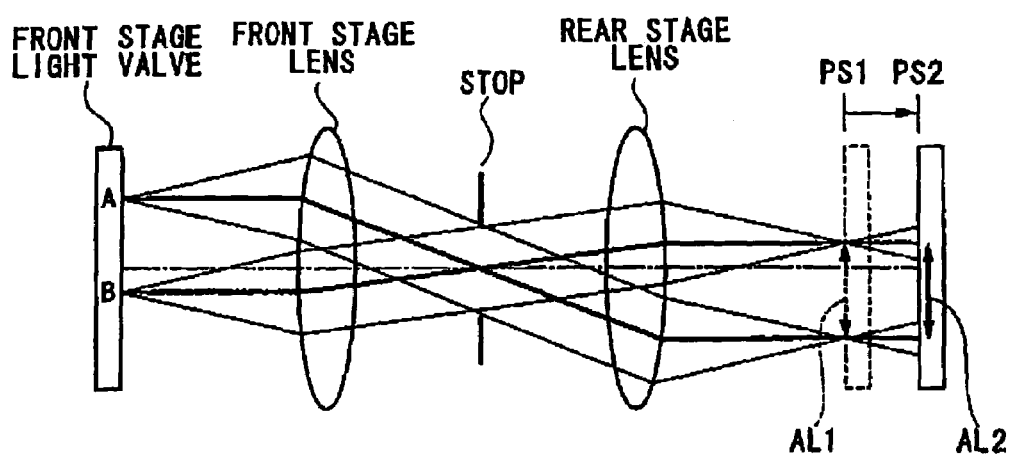
FIG. 7A is a drawing showing a relay optical system having bilateral telecentricity.
Figure 7B:
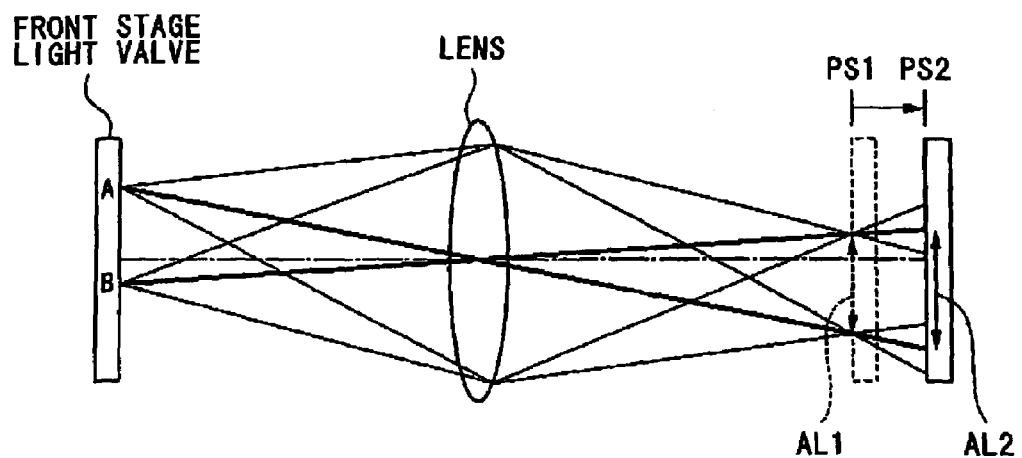
FIG. 7B is a drawing of a typical relay optical system.

FIGS. 6A, 6B, 7A and 7B are drawings for explaining telecentricity, with FIGS. 6A and 7A indicating relay optical systems having bilateral telecentricity, and FIGS. 6B and 7B indicating typical relay optical systems.

As shown in FIG. 6A, a telecentric optical system refers to an optical system in which the chief ray indicated with the solid thick line is parallel to the optical axis in the object side (front stage light valve side) space or the image side (rear stage light valve side) space, and that which is telecentric with respect to both the object side (front stage light valve side) and image side (rear stage light valve side) is referred to as a bilateral telecentric optical system. In a relay optical system having bilateral telecentricity, the chief ray emitted front stage light valve (a liquid crystal light valve in this example) is emitted nearly perpendicularly from any site of the front stage light valve, and enters the rear stage light valve (a liquid crystal light valve in this example) nearly perpendicularly. Thus, the radiation angle distribution of a light bundle emitted from a location (A) far from the optical axis of the front stage light valve is nearly equal when compared with the radiation angle distribution of a light bundle emitted from a location (B) close to the optical axis.

On the other hand, as own in FIG. 6B, in the case of a typical relay optical system, the chief ray indicated with the solid thick line has a different radiation angle depending on the emergent location of the front stage light valve, and also differs depending on the incident angle and incident location of the rear stage light valve. Thus, the radiation angle distribution of a light bundle emitted from a location (A) far from the optical axis of the front light light valve is quite different when compared with the radiation angle distribution of a light bundle emitted from a location (B) close to the optical axis However, liquid crystal light valves typically have visual angle dependency. Namely, contrast characteristics, brightness characteristics, spectral characteristics and so forth differ depending on the angle of light beams emitted from the liquid crystal light valve. Thus, in the case of the typical relay lens shown in FIG. 6B, the radiation angle distribution of emergent light bundles differ for each region of the front stage light valve (liquid crystal light valve), and as a result, distribution (non-uniformity) occurs in the brightness, tint and contrast of display images within the screen of the rear stage light valve liquid crystal light valve), thereby resulting in the possibility of leading to a decrease in the image display quality of the projector.

In contrast, in the relay optical system having bilateral telecentricity shown in FIG. 6A, since emergent light bundles of any region of the front stage light valve (liquid crystal light valve) have nearly the same radiation angle distribution, the brightness, tint and contrast of display images within the screen of the rear stage light valve (liquid crystal light valve) am nearly uniform, thereby resulting in satisfactory image display quality of the project.

Moreover, as shown in FIG. 7A, in the case of a relay optical system having bilateral telecentricity, even if an error occurs in the aged location of a rear stage light valve in the direction of the optical axis (PS1→PS2 in FIG. 7A), since the chief ray is parallel to the optical axis, there is hardly any change in the size of the image of the front stage light valve even though some blurring may occur (AL1≈AL2 in FIG. 7A). Namely, even if there is some error in the arranged location of the rear stage light valve, since there is very little decrease in the image display quality in terms of the projector, the production is large.

On the other hand, as shown in FIG. 7B, in the case of a typical relay optical system, in the case an arrangement error equivalent to that described above occurs in the rear stage light valve (PS1→PS2 in FIG. 7B), since the chief ray is not parallel to the optical axis, the size of the image of the front stage light valve changes simultaneous to the occurrence of blurring (AL1<AL2 in FIG. 7B), and as a result, there is the possibility of a significant decrease in the image display quality.

Next, a detailed explanation is provided of the constitution of display control device 200 based on FIGS. 8 through 16.

Figure 8:
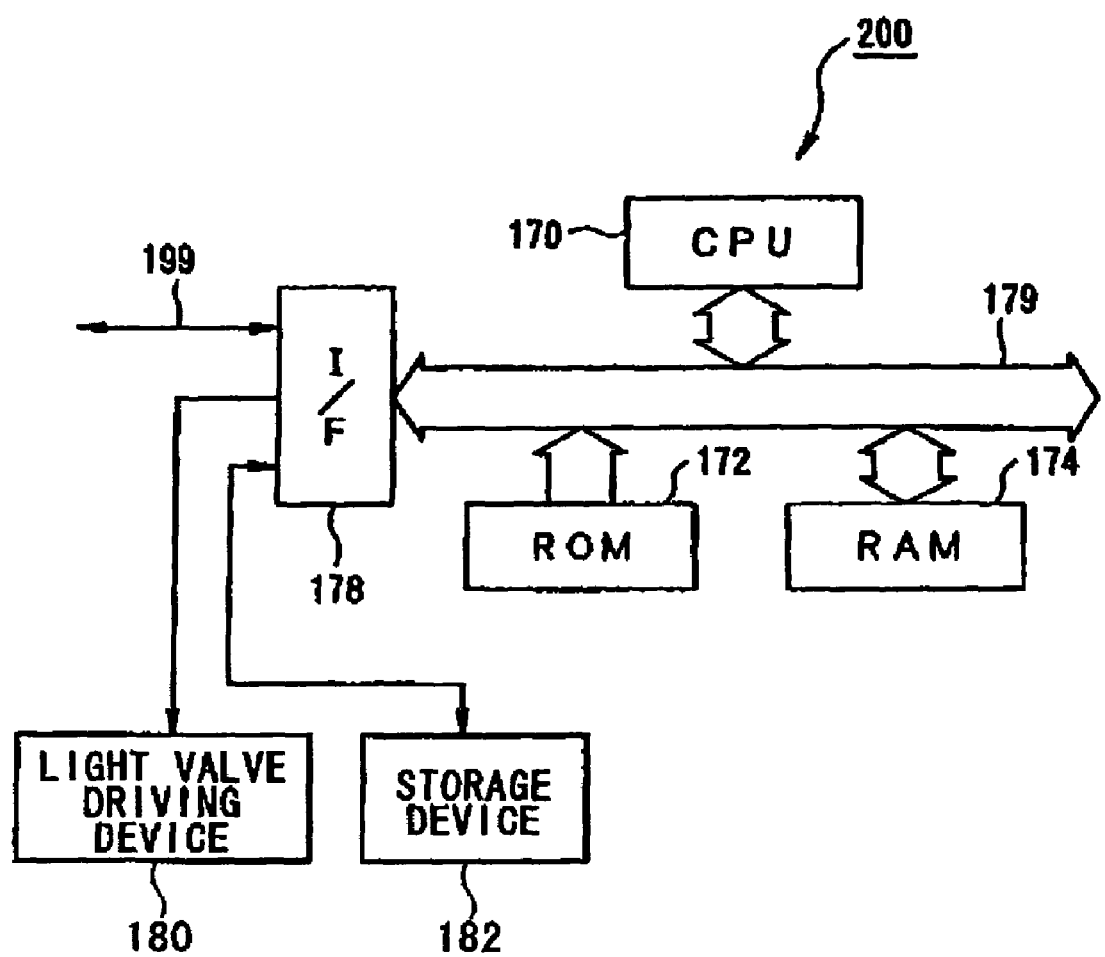
FIG. 8 is a block diagram showing the hardware configuration of a display control device 200.

FIG. 8 is a block diagram showing the hardware configuration of display control device 200.

As shown in FIG. 8, display control device 200 is composed of a CPU 170 that controls arithmetic processing and the entire system based on a control program, a ROM 172 that stores the control program and so forth of CPU 70 in a predetermined area, a RAM 174 for storing data read from ROM 172 and so forth as well as arithmetic processing results required during the course of arithmetic processing by CPU 170, and an I/F 178 that mediates the input and output of data for an external device, and these are mutually connected while allowing the exchange of data with a bus 179 in the form of a signal line for transferring data.

A light valve driving device 180, which drives the luminance modulation light valve (liquid crystal light valve 100) and color modulation light valves (liquid crystal light valves 60B, 60G and 60R), a storage device 182 that stores data, tables and so forth as files, and a signal line for connecting to an external network 199 are connected as external devices to I/F 178.

Storage device 182 stores HDR display data for driving the luminance modulation light valve and the color modulation light valves.

HDR display data refers to image data capable of realizing a high luminance dynamic range that cannot be realized with conventional sRGB or other image formats, and stores pixel values that indicate the luminance level of a pixel for all pixels of an image. In the present embodiment, a format is used for HDR display data in which pixel values that indicate the luminance level for each of the three primary colors of red, green and blue for a single pixel are stored in the form of floating decimal point values. For example, a value of (1.2, 5.4, 2.3) may be stored as a pixel value of a single pixel.

Here, the following formulas (1) and (2) are valid when the luminance level of a pixel p contained in HDR display data is taken to be Rp, the transmission factor of a pixel corresponding to pixel p of the second optical modulation element is taken to be T1, and the transmission factor of a pixel corresponding to pixel p of a second optical modulation element is taken to be T2.

$$Rp = Tp \times Rs \quad (1)$$

$$Tp = T1 \times T2 \times G \quad (2)$$

In formulas (1) and (2), Rs resent the luminance of a light souroe, G represents the gain and both of these are constants. In addition, Tp is the optical modulation rate.

Furthermore, a detailed description of methods for generating HDR display data is contained in, for example, Known Document 1 (P. E. Debevec and J. Malik, "Recovering High Dynamic Range Radiance Maps from Photographs", Proceedings of ACM SIGGRAPH97, pp. 367-378 (1997)).

In addition, storage device 182 stores a control value registration table 400 in which are registered control values of the luminance modulation light valve.

FIG. 9 is a drawing that shows the data structure of control value registration table 400.

As shown in FIG. 9, a single record is registered for each control value of the luminance modulation light valve in control value registration table 400. Each record is composed of a field in which the control values of the luminance modulation light valve are registered, and a field in which transmission factors of the luminance modulation light valve are registered.

In the example of FIG. 9, a control value of "0" and a transmission factor of "0.003" are respectively registered in the first record. This indicates that when a control value of "0" is output to the luminance modulation light valve, the transmission factor of the luminance modulation light valve becomes 0.3%. Furthermore, although FIG. 9 shows an example of the case in which the number of gradations of the luminance modulation light valve is 4 bits (values of 0 to 15), in actuality, records are registered corresponding to the number of gradations of the luminance modulation light valve. For example, in the case the number of gradations is 8 bits, then 256 records would be registered.

In addition, storage device 182 stores control value registration tables in which are registered control values of the color modulation light valves for each color modulation light valve.

Figure 10:
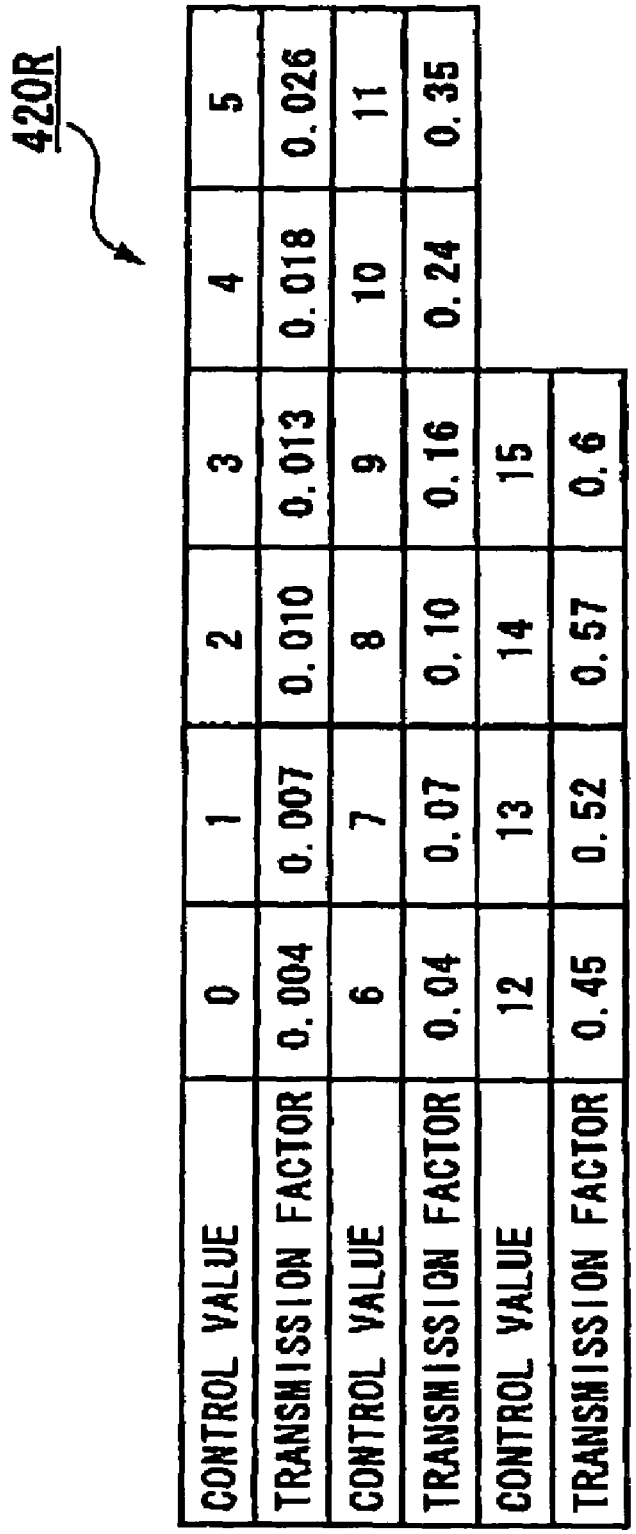
FIG. 10 is a drawing showing the data structure of a control value registration table 420R.

FIG. 10 is a drawing showing he data structure of control value registration table 420R in which is registered the control values of liquid crystal light valve 60R.

As shown in FIG. 10, a single record is registered in control value registration table 420R for each control value of liquid crystal light valve 60R. Each record is composed of a field in which is registered the control values of liquid crystal light valve 60R, and a field in which is registered the transmission factors of liquid crystal light valve 60R.

In the example of FIG. 10, a value of "0" is registered for the control value and a value of "0.004" is registered for the transmission factor in the first record. This indicates that when a control value of "0" is output to liquid crystal valve 60R, the transmission factor of liquid crystal light valve 60R becomes 0.4%. Furthermore, although FIG. 10 shows an example of the case in which the number of gradations of the color modulation light valves is 4 bits (values of 0 to 15), in actuality, records are registered corresponding to the number of gradations of the color modulation light valves. For example, in the case the number of gradations is 8 bits, then 256 records would be registered.

In addition, although the data structures of the control value registration tables corresponding to liquid crystal light valves 60B and 60G are not shown, they have the same data structure as that of control value registration table 420R. However, the difference between these tables and control value registration table 420R is that different transmission factors are registered for the same control values.

Next, an explanation is provided of the constitution of CPU 170 and the processing performed by CPU 170.

CPU 170 is composed of a microprocessing unit (MPU) and so forth. It starts up a predetermined program contained in a determined area of ROM 172, and performs the display control processing shown in the flow chart of FIG. 11 in accordance with that program.

Figure 11:
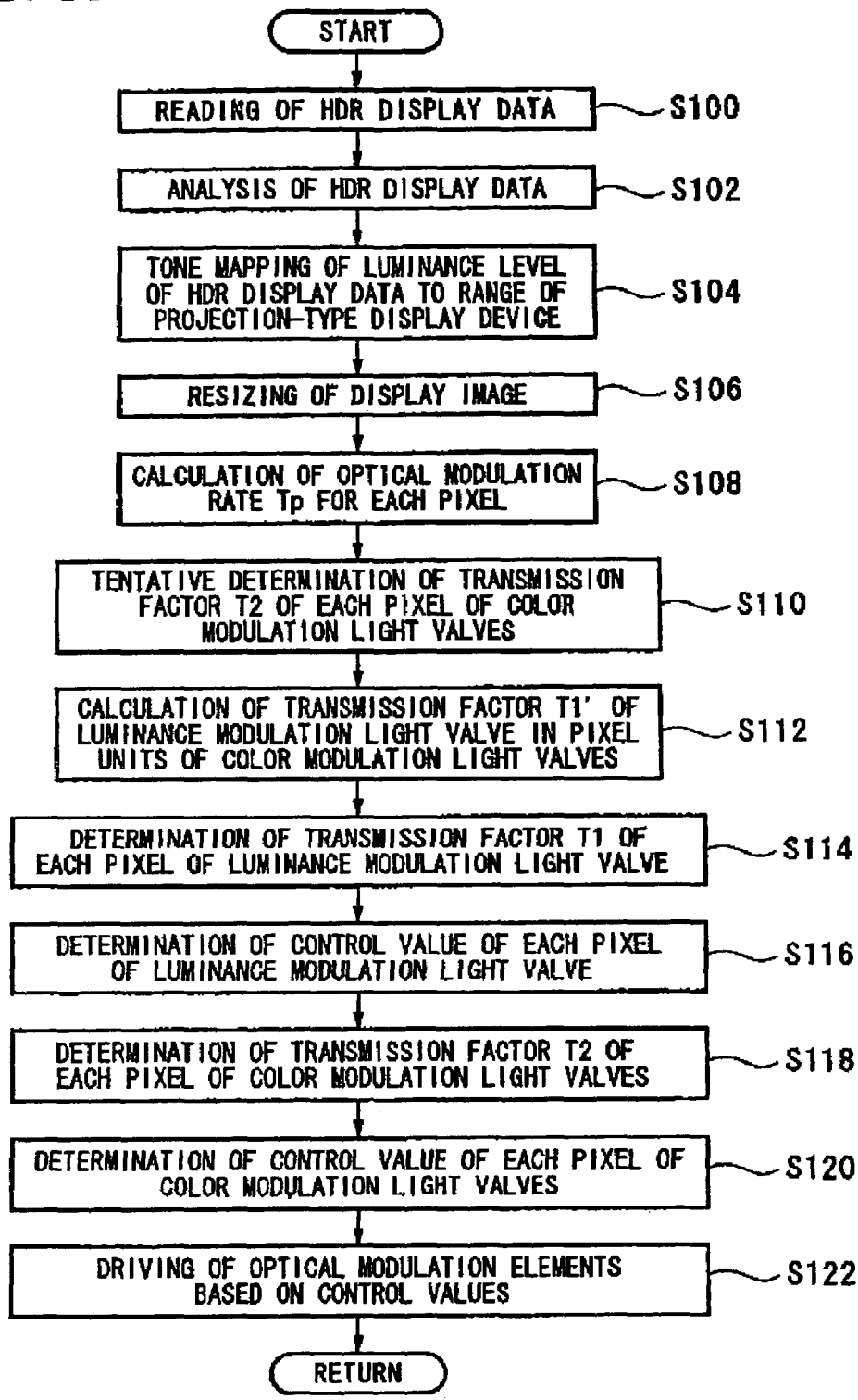
FIG. 11 is a flow chart showing display control processing.

FIG. 11 is a flow chart showing display control processing.

Display control processing consists of determining the respective control values of the luminance modulation light valve and color modulation light valves based on HDR display data, and then driving the luminance modulation light valve and color modulation light valves based on the determined control values. When this processing is performed by CPU 170, processing first proceeds to step S100 as shown in FIG. 11.

In step S100, HDR display data is read from storage device 182.

Next, processing proceeds to step S102 where the read HDR display data is analyzed followed by calculation of a pixel value histogram along with the maximum, minimum and average values of the luminance levels. These analysis results are used to brighten dark scenes, darken excessively bright scenes, coordinate the contrast of intermediate sections and perform other forms of automatic image correction or are used for tone mapping.

Next, processing proceeds to step S104 when the luminance levels of HDR display data are tone mapped to the luminance dynamic range of projection-type display device 1 based on the analysis results of step S102.

Figure 12:
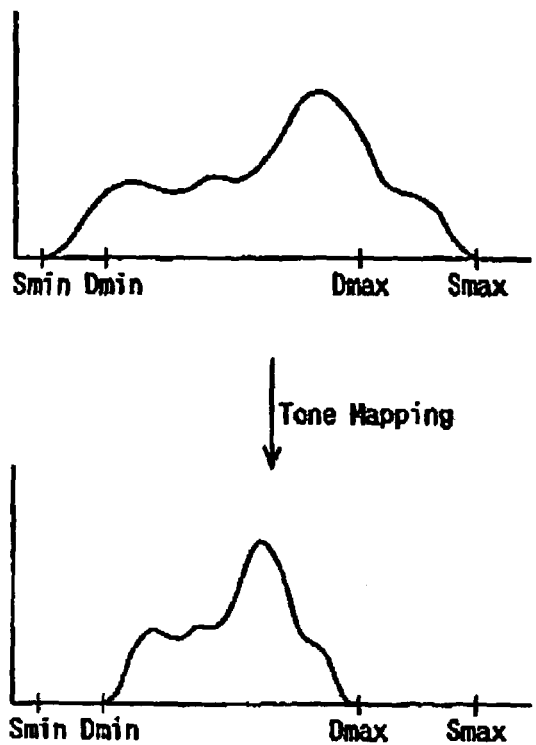
FIG. 12 is a drawing for explaining tone mapping processing.

FIG. 12 is a drawing for explaining tone mapping processing.

As a result of having analyzed HDR display data, the minimum value of the luminance levels contained in the HDR display data is represented with Smin, while the maximum value is represented with Smax. In addition, the minimum value of the luminance dynamic range of projection-type display device 1 is represented with Dmin, while the maximum value is represented with Dmax. In the example of FIG. 12, since Smin is smaller than Dmin and Smax is larger Dmax, HDR display data cannot be properly displayed as is. Thereof, the histogram of Smin to Smax is normalized so as to be contained in the range of Dmin to Dmax.

Furthermore, details regarding tone mapping are described in, for example, Known Document 2 (F. Drago, K. Myszkowski, T. Annen and N. Chiba, "Adaptive Logarithmic Mapping For Displaying High Contrast Scenes", Eurographics 2003, (2003)).

Next, processing proceeds to step S106 where the HDR image is resized (enlarged or reduced) to match the resolution of the color modulation light valves. At this time, the HDR image is resized while maintaining the aspect ratio of the HDR image. Examples of resizing methods include the mean value method, intermediate value method and nearest neighbor method.

Next, processing proceeds to step S108 where the optical modulation rate Tp is calculated for each pixel of the resized image using the aforementioned formula (1) based on luminance level Rp of each pixel of the resized image as well as luminance Rs of light source 10.

Next, processing proceeds to step S110 where an initial value (e.g., 0.2) is given as transmission factor T2 of each pixel of the color modulation light valves to tentatively determine transmission factor T2 of each pixel of the color modulation light valves.

Next, processing proceeds to step S112 where transmission factor T1' of the luminance modulation light valve is calculated in pixel units of the color modulation light valves using the aforementioned formula (2) based on the calculated optical modulation rate Tp, the tentatively determined transmission factor T2 and gain G. Here, since the color modulation light valves are composed of three liquid crystal light valves 60B, 60G and 60R, transmission factor T1' is calculated for each of the three primary colors of red, green and blue for the same pixel. In contrast, since the luminance modulation light valve is composed of a single liquid crystal light valve 100, their average values are calculated as T1' of that pixel.

Next, processing proceeds to step S114 where the weighted average of transmission factor T1', which has been calculated for each pixel of the color modulation light valves that are overlapping in the light path with that pixel, is calculated as transmission factor T1 of that pixel for each pixel of the luminance modulation light valve. Weighting is carried out according to the surface area ratio of the overlapping pixels.

Next, processing proceeds to step S116 where a control value corresponding to transmission factor T1 calculated for that pixel is read from control value registration table 400 for each pixel of the luminance modulation light valve, and the read control value is determined as the control value of that pixel. When reading out control values, the transmission factor that most closely approximates the read transmission factor T1 is searched for in control value registration table 400, and the control value is read that corresponds to the transmission factor that is found as a result of that search. For example, high-speed searching can be realized by searching using a binary search method.

Next, processing proceeds to step S118 where the weighted average of transmission factor T1 determined for those pixels of the luminance modulation light valve that overlap in the light path with that pixel is calculated for each pixel of the color modulation light valves, and transmission factor T2 of that pixel is calculated using the aforementioned formula (2) based on the calculated average value, optical modulation rate Tp calculated in step S108 and gain G. Weighting is carried out according to the surface area ratio of the overlapping pixels.

Next, processing proceeds to step S120 where control values corresponding to transmission factor T2 calculated for those pixels are read from control value registration tables for each pixel of the color modulation light valves, and the read control values are determined as the control values of those pixels. When reading out control values, the transmission factor that most closely approximates the read transmission factor T2 is searched for in the control value registration tables, and the control value is read that corresponds to the transmission factor that is found as a result of that search. For example, high-speed search can be realized by searching using a binary search method.

Next, processing proceeds to step S122 where the control values determined in steps S116 and S120 are output to light valve driving device 180, the display image is projected by respectively driving the color modulation light valves and luminance modulation light valve to complete a single series of processing, after which processing returns to the original processing.

Next, an explanation is provided of the process for generating image data written to the color modulation light valves (liquid crystal light valves 60, 60G and 60R) and the luminance modulation light valve (liquid crystal light valve 100) based on FIGS. 13 through 16.

In the following explanation, the example is used in which each of the color modulation light valves (liquid crystal light valves 60B, 60G and 60R) has a resolution of 18 pixels horizontally and 12 pixels vertically and 4 bits of gradations, while the luminance modulation light valve (liquid crystal light valve 100) has a resolution of 15 pixels horizontally and 10 pixels vertically and 4 bits of gradations.

In display control device 200, HDR display data is read out, the read HDR display data is analyzed, and the luminance level of the HDR display data is tone mapped to the luminance dynamic range of projection-type display device 1 based on those analysis results in steps S100 through S104. Next, in step S106, the HDR image is resized to match the resolution of the color modulation light valves.

Next the optical modulation rate Tp is calculated for each pixel of the resized it in step S108. For example, if the luminance level Rp (R,G,B) of a pixel p is take to be (1.2, 5.4, 2.3) and luminance Rs (R,G,B) of light source 10 is taken to be (10000,10000,10000), then optical modulation rate Tp of pixel p in the resized image becomes (1.2, 5.4, 2.3)/(10000, 10000,10000)=(0.00012, 0.00054,0.00023).

Figure 13:
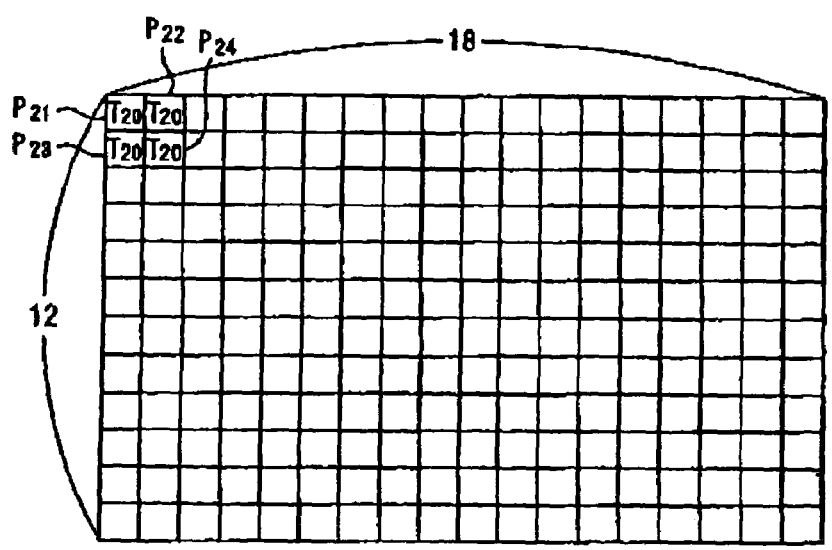
FIG. 13 is a drawing showing the case of tentatively determining transmission factors T2 of color modulation light valves.

FIG. 13 is a drawing showing the case of tentatively determining transmission factor T2 of the color modulation light valves.

Next, transmission factor T2 of each pixel of the color modulation light valves is tentatively determined in step S110. In the case the pixels of the four upper left blocks of the color modulation light valves are to be p21 (upper left), p22 (upper right), p23 (lower left) and p24 (lower right), then an initial value of T20 is given for transmission factor T2 of pixels p21 through p24 as shown in FIG. 13.

Figure 14:
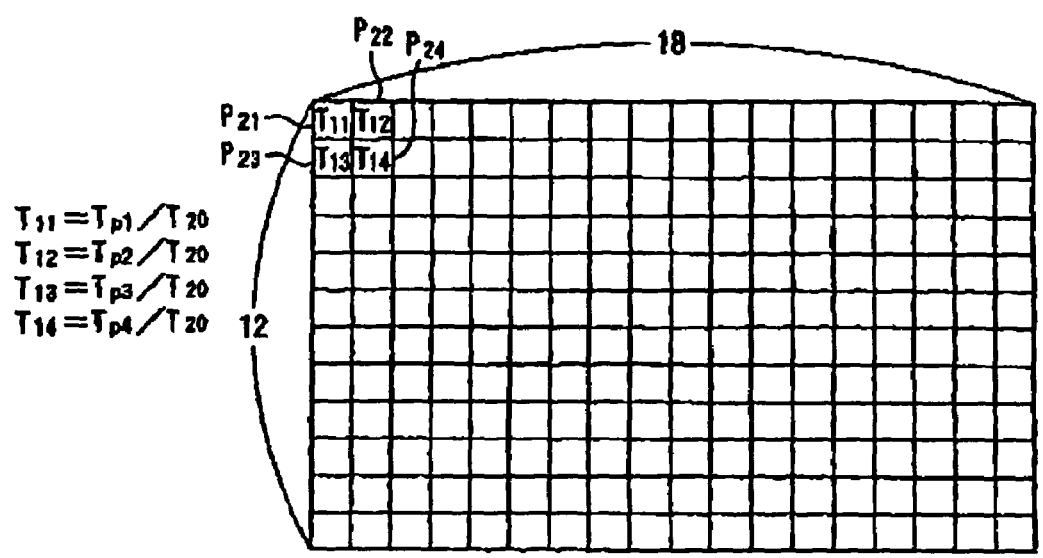
FIG. 14 is a drawing showing the case of calculating a transmission factor T1' of a luminance modulation light valve in pixel units of color modulation light valves.

FIG. 14 is a drawing showing the case in which transmission factor T1' of a luminance modulation light valve is calculated in pixel units of the color modulation light valves.

Next, transmission factor T1' of the luminance modulation light valve is calculated in pixel units of the color modulation light valves in step S112. In the case of focusing on pixels p21 through p24, the corresponding transmission factors T11 through T14 of the luminance modulation light valve can be calculated from the following formulas (3) through (6) as shown in FIG. 14 if the optical modulation rates of pixels p21 through p24 are represented with Tp1 through Tp4, and gain G is represented with a "1".

Calculations are made using actual values. In the case Tp1=0.00012, Tp2=0.05, Tp3=0.02, Tp4=0.01 and T20=0.1, then T11=0.0012, T12=0.5, T13=0.2 and T14=0.1.

$$T11=Tp1/T20 \quad (3)$$

$$T12=Tp2/T20 \quad (4)$$

$$T13=Tp3/T20 \quad (5)$$

$$T14=Tp4/T20 \quad (6)$$

Figure 15A:
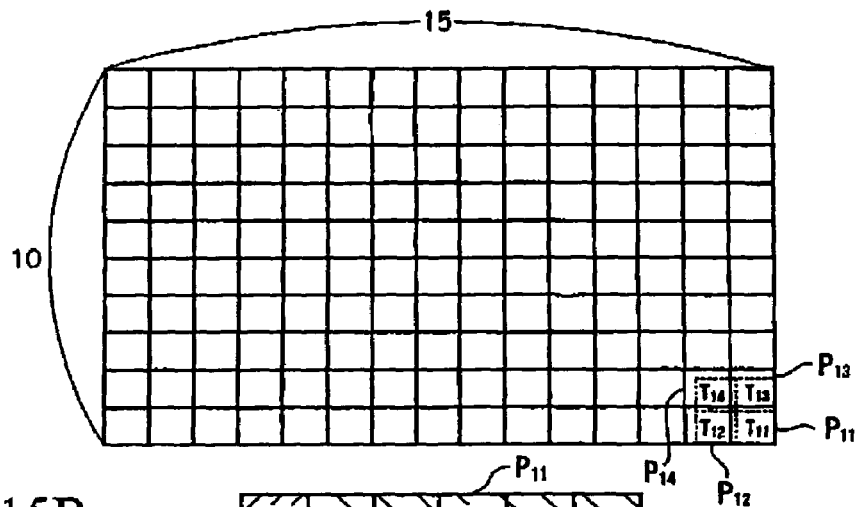
FIGS. 15A, 15B and 15C are drawings showing the case of determining a transmission factor T1 of each pixel of a luminance transmission light valve.
Figure 15B:
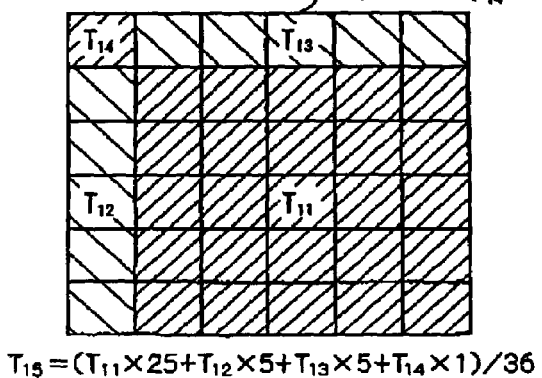
Figure 15C:
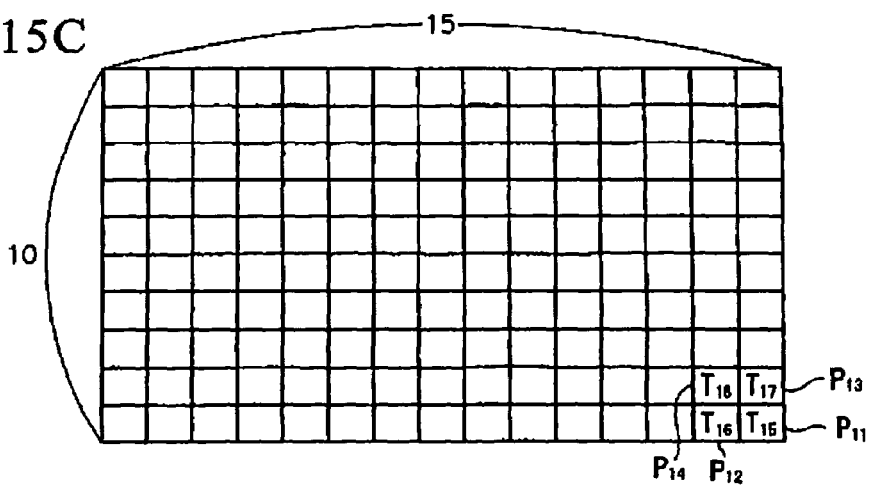

FIGS. 15A, 15B and 15C are drawings showing case of determining transmission factor T1 of each pixel of a luminance modulation light valve.

Next, transmission factor T1 of each pixel of the luminance modulation light valve is determined in step S114. Sine the color modulation light valves and the luminance light valves are inverted relation to each other by the relay optical system composed of incident lenses 70B, 70G and 70R, the relay lens 90 and the emergent side lens 95, pixels of the four upper left blocks of the color modulation panel form image on the lower right block of the luminance light valve. In the case the pixels of the four lower right block of the luminance modulation light valve are taken to be p11 (lower right), p12 (lower left), p13 (upper right) and p14 (upper left), as shown in FIG. 15A, pixel p11 overlaps on the light path with pixels p21 through p24 since the color modulation light valves and luminance modulation light valve have different resolutions. Since the resolution of the color modulation light valves is 18×12 while the resolution of the luminance modulation light valve is 15×10, pixel p11 can be divided into a 6×6 square area based on the least common multiple of the number of pixels of the color modulation light valves. As shown in FIG. 15B, the overlapping surface area ratio between pixel p11 and pixels p21 through p24 then becomes 25:5:5,1. Thus, transmission factor T15 of pixel p11 can be calculated from formula (7) below as shown in FIG. 15C.

This calculation is made using actual values. In the case T11=0.0012, T12=0.5, T13=0.2 and T4=0.002, then from formula (7) below, T15=0.1008.

$$T15=(T11\times25+T12\times5+T13\times5+T14\times1)/36 \quad (7)$$

Transmission factors T16 through T18 of pixels p12 through p14 can also be defined in the same manner as pixel p11 by calculating the weighted average from the surface area ratio.

Next, a control value corresponding to transmission factor T1 calculated for that pixel is read from control value registration table 400 for each pixel of the luminance modulation light valve, and the read control value is determined to be the control value of that pixel in step S116. For example, since T15=0.1008, referring to control value registration table 400 shows that 0.09 is the closest value as shown in FIG. 9. Thus, a value of "8" is read from control value registration table 400 for the control value of pixel p11.

Figure 16A:
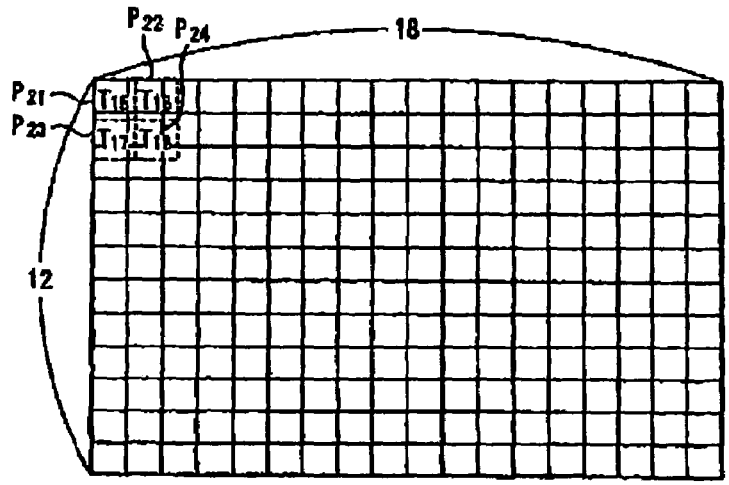
FIGS. 16A, 16B and 16C are drawings showing the case of determining transmission factors T2 of each pixel of color modulation light valves.
Figure 16B:
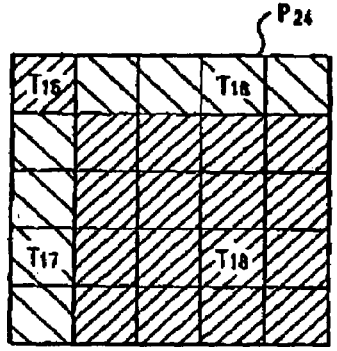
Figure 16C:
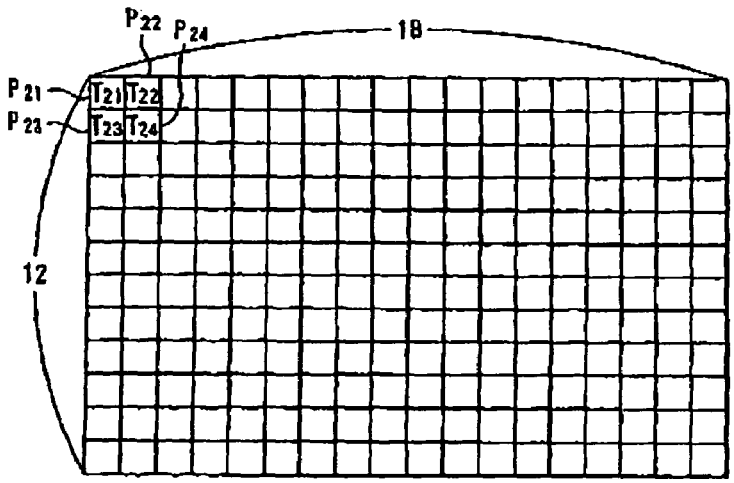

FIGS. 16A, 16B and 16C are drawings showing the case of determining transmission factor 12 for each pixel of each color modulation light valve.

Next, transmission factor T2 of each pixel of the color modulation light valves is determined in step S118. As shown in FIG. 16A, pixel p24 overlaps on the light path with pixels p11 through p14 since the resolutions of the color modulation light valves and the luminance modulation light valve are different. Since the resolution of the color modulation light valves is 18×12 while the resolution of the luminance modulation light valve is 15×10, pixel p24 can be divided into a 5×5 square area based on the least common multiple of the number of pixels of the luminance modulation light valve. As shown in FIG. 16B, the overlapping surface area ratio between pixel p24 and pixels p11 through p14 becomes 1:4:4:16. Thus, in the case of focusing on pixel p24, transmission factor T19 of the corresponding luminance modulation light valve can be calculated using formula (8) below. As shown in FIG. 14C, if gain G is assumed to be "1", then transmission actor 174 of pixel p24 can be calculated from formula (9) below.

These calculations are made using actual values. In the case T15=0.09, T16=0.33, T17=0.15, T18=0.06 and Tp4=0.01, then T19=0.1188 and T24=0.0842 from formulas (8) and (9) below.

$$T19=(T15\times1+T16\times4+T17\times4+T18\times6)/25 \quad (8)$$

$$T24=Tp4/T19 \quad (9)$$

Transmission factors T21 through T23 of pixels p21 through p23 can be determined in the same manner as pixel p24 by calculating the weighted average from the surface area ratio.

Next, control values corresponding to transmission factor T2 calculated for those pixels are read from the control value registration tables for each pixel of the color modulation light valves, and the control values are determined as the control values of those pixels in step S120. For examples, in the case T24=0.0842 for pixel p24 of liquid crystal light valve 60R, referring to control value registration table 420R shows that 0.07 is the closest value as shown in FIG. 10. Thus, a value of "7" is read from control value registration table 420R for the control value of pixel p24.

The determined control values are then output to light valve driving device 180 in step S122. As a result, a display image is projected onto a screen by respectively driving the luminance modulation light valve (liquid crystal light valve 100) and the color modulation light valves (liquid crystal light valves 60B, 60G and 60R).

The following effects are demonstrated by projection-type display device 1 composed in the manner described above. Since a second optical modulation element in the form of liquid crystal light valve 100 is arranged in the rear stage of first optical modulation elements in the form of liquid crystal light valves 60B, 600 and 60R and light-synthesizing cross dichroic prism 80 with incident side lenses 70B, 70G and 70R, relay lens 90 and emergent side lens 95 there between, in the case of comparing with a similar optical system of the prior art in which liquid crystal light valve 100 is arranged in the front stage of dichroic mirrors 30 and 35 and liquid crystal light valves 60B, 60G and 60R, since optical systems such as reflecting mirror 36, relay optical system 40 and parallelizing lenses 50B, 500 and 50R are not interposed, the distance between the two optical modulation elements can be shortened. As a result, together with being able to improve the accuracy of image formation (transmission) since the optical aberration of the transmitted light can be reduced, since a complicated optical system for correcting optical aberration is not required, costs can also be reduced.

In addition, since light from light source 10 is modulated through two optical modulation elements arranged in series (color modulation light valves and luminance modulation light valve), a comparatively high luminance dynamic range and number of gradations can be realized.

First Variation of the First Embodiment

Figure 19:
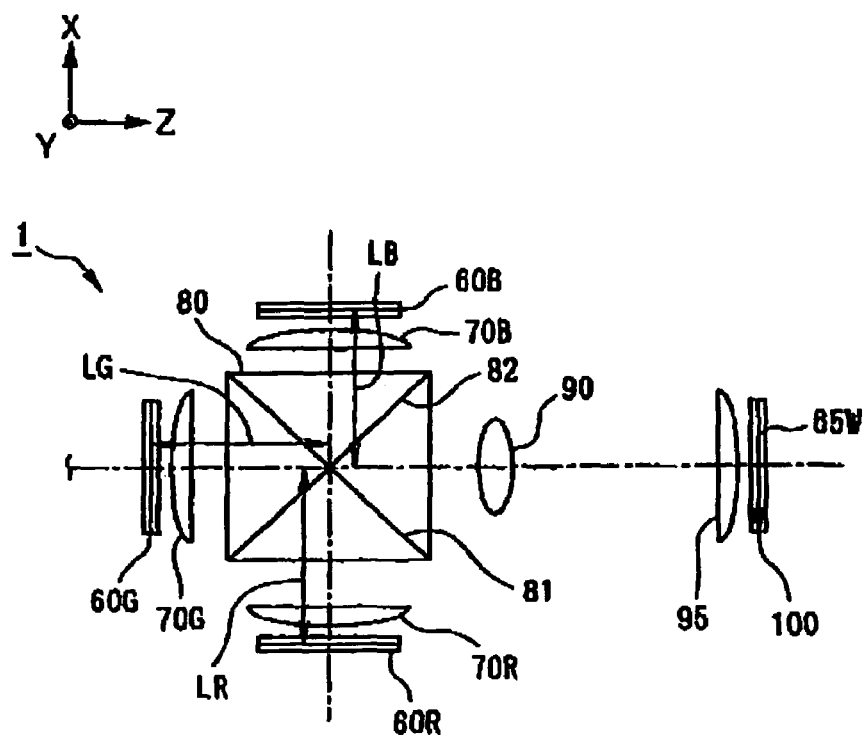
FIG. 19 is a drawing showing an example of one constitution in which the respective distances between cross dichroic prism 80 for color synthesis and liquid crystal light valves 60B, 60G and 60R.

Although a constitution was employed in the aforementioned first embodiment in which each liquid crystal light valve 60B, 60G and 60R is arranged so that LB=LG=LR (equidistant) when the distances between the center of light-synthesizing cross dichroic prism 80 and the three locations of liquid crystal light valves 60B, 600 and 60R are taken to be LB, LG and LR, respectively, the present invention is not limited to this. Since the materials that form each lens and the light-synthesizing cross dichroic prism and so forth has various types of wavelength dependency (e.g., refractive index), in order to realize the transmission of optical images (light intensity distribution) with both high accuracy and high efficiency between the first optical modulation elements and second optical modulation element, it is necessary to reduce the effects of wavelength dependency and optical aberration that is likely to occur in the transmission process. One way of realizing this is to employ a constitution in which liquid crystal light valves 60B, 60G and 60R are arranged at three locations relative to light-synthesizing cross dichroic prism 80 such that the aforementioned three distances LB, LG and LR are mutually different. For example, in the case the wavelength dependency of the refractive index of the material that composes the aforementioned light-synthesizing cross dichroic prism 80 is such that the refractive index is larger on the short wavelength side and smaller on the long wavelength side (and the majority of glass has this tendency), by making the distance between liquid crystal light valves 60B, 60G and 60R and liquid crystal light valve 100 to be shorter the greater the correlation with light having a short wavelength optical aberration caused by wavelength dependency of the refractive index can be reduced. Thus, as shown in FIG. 19, a constitution can be employed in which liquid crystal light valves 60B, 60G and 60R are arranged so that the distances between light-synthesizing cross dichroic prism 80, in which the light path is separated for each colored light, and the three locations of liquid crystal light valves 60B, 60G and 60F, respectively, satisfies the relationship of LB<LG<LR.

Second Embodiment

Figure 17:
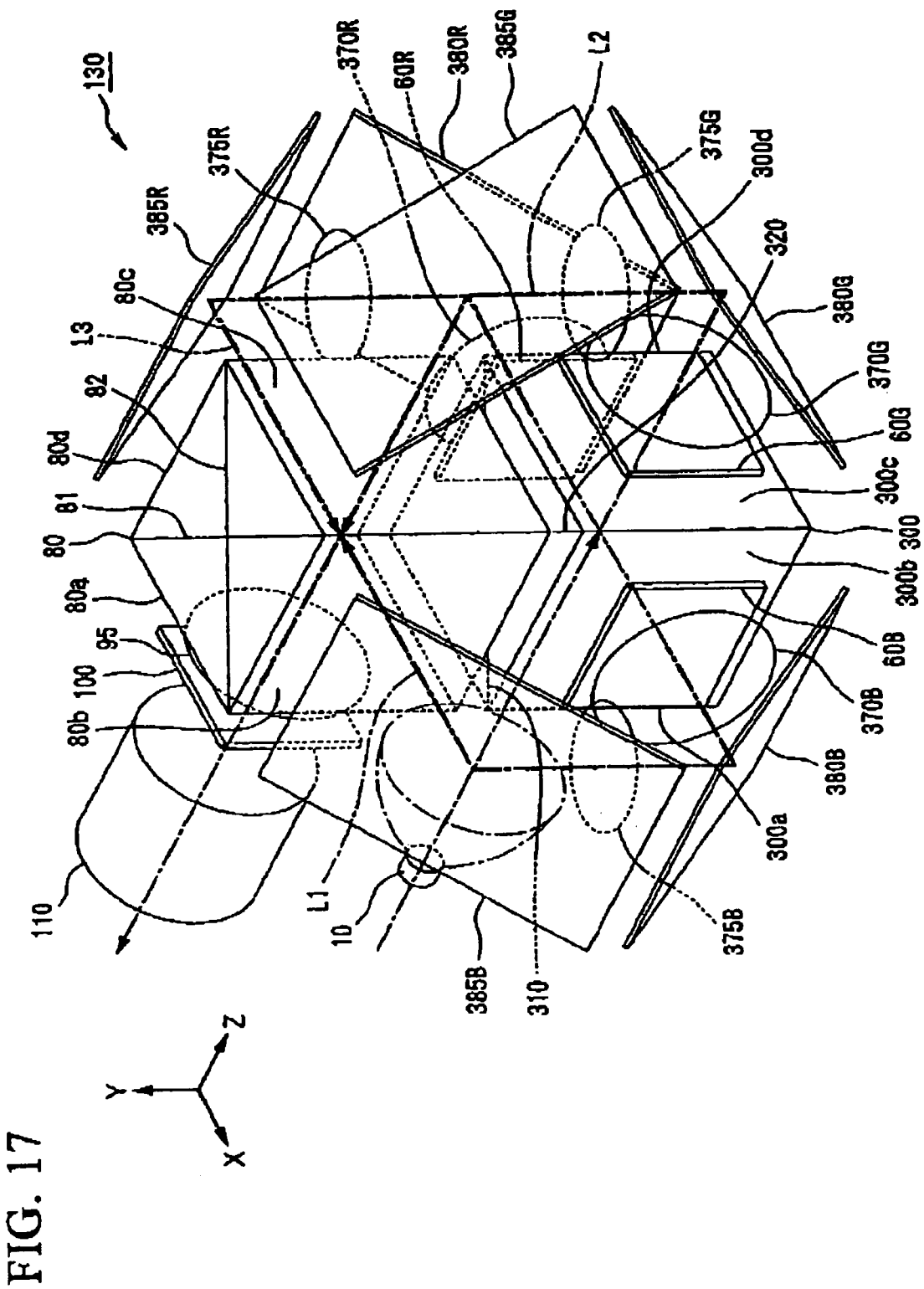
FIG. 17 is a drawing showing the main optical configuration of a projection-type display device 130 as claimed in the present invention.

Moreover, the following provides an explanation of a second embodiment of an optical display device and projection-type display device as claimed in the present invention based on FIG. 17. FIG. 17 is a drawing showing the main optical configuration of a projection-type display device 130 capable of transmitting three colors of light resolved with a light-dividing spectral cross dichroic prism to a light-synthesizing cross dichroic prism that synthesizes colored light along the same optical path lengths. Here, the same reference symbols are used for those constituents of the second embodiment that are the same as those of the projection-type display device 1 in the aforementioned first embodiment, and their explanations are omitted.

Projection-type display device 130 is composed to contain a light source 10, an optical separation unit in the form of a light-dividing cross dichroic prism 300, liquid crystal light valves 60B, 600 and 60R, incident side lenses 370B, 370G and 370R, relay lenses 375B, 375G and 375R, reflecting mirrors 380B, 380G, 380R, 385B, 385G and 385R, a light synthesis unit in the form of light-synthesizing cross dichroic prism 80, an emergent side lens 95, a liquid crystal light valve 100 and a projection lens 110.

Light-dividing cross dichroic prism 300 has a hexahedron shape comprised by joining four triangular column-shaped prisms in the same manner as light-synthesizing cross dichroic prism 80, and a blue light reflecting dichroic film and a red light reflecting dichroic film are arranged inside in the form of an X-shaped cross-section. Namely, blue light reflecting dichroic film 310 for reflecting blue light in the direction of liquid crystal light valve 60B is formed on a joining surface of the prism, and red light reflecting dichroic film 320 for reflecting red light in the direction of liquid crystal light valve 60R is formed on a joining surface of the prism. As a result white light from the light source is divided into colored light having the three primary colors of red, green and blue, and radiated towards liquid crystal light valves 60B, 60G and 60R corresponding to each colored light. Here, among the aforementioned six surfaces, the surface at which white light enters from light source 10 is referred to as incident surface 300a, the surface from which blue light is radiated after the white light is divided into the three primary colors of light is referred to as first emergent surface 300b, the surface from which green light is radiated is referred to as second emergent surface 300c, and the surface from which red light is radiated is referred to as third emergent surface 300d. In addition, among the aforementioned six surfaces of light-synthesizing cross dichroic prism 80, the surface from which synthesized light is radiated is referred to as emergent surface 80a, the surface at which blue light enters is referred to as first incident surface 80b, the surface at which green light enters is referred to as second incident surface 80c, and the surface at which red light enters is referred to as third incident surface 80d.

Light-dividing cross dichroic prism 300 and light-synthesizing cross dichroic prism 80 are arranged at a location where lines extending from the intersecting lines produced by the two dichroic films present inside each prism lie roughly on the same line, and so that incident 300a of light-dividing cross dichroic prism 300 and emergent surface 80a of light-synthesizing cross dichroic prism 80 are located roughly in the same plane, or in other words, in a positional relationship as if stacked in the direction of the Y axis. As a result of having this positional arrangement, incident surface 300a and emergent surface 80a, first emergent surface 300b and first incident surface 80b, second emergent surface 300c and second incident surface 80c, and third emergent surface 300d and third incident surface 80d each form pairs and are located moving towards the direction of the Y axis, and the light paths of the three colors of light can be set to roughly the same length from light-dividing cross dichroic prism 300 to light-synthesizing cross dichroic prism 80.

Incident side lenses 370B, 3700 and 370R have the same function, as incident side lenses 70B, 70G and 70R in projection-type display device 1. Namely, they have the function of allowing each color of modulated light that has been modulated by each corresponding liquid crystal light valve 60B, 60G and 60R to efficiently enter relay lenses 375B, 375G and 375R located on each light path, and cause each modulated light to converge and enter the corresponding relay lenses 375B, 375G and 375R.

Reflecting mirrors 380B, 380G and 380R have the function of bending the light path and guiding color light from each incident side lens 370B, 370G and 370R into the corresponding relay lens 375B, 3750 and 375R. Similarly, reflecting mirrors 385B, 385G and 385R also have the function of bending the light path and guiding colored light from each relay lens 375B, 375G and 375R into first incident surface 80b, second incident surface 80c and third incident surface 80d corresponding to light-synthesizing cross dichroic prism 80.

Relay lenses 375B, 375G and 375R have the same function as relay lens 90 in projection-type display device 1. Namely, they have the function of accurately transmitting three optical images (light intensity distributions) formed on the display surfaces of liquid crystal light valves 60B, 60G and 60R at three locations to the display surface of liquid crystal light valve 100 wile nearly completely maintaining their intensity distributions and accompanying hardly any optical loss, and guiding each colored light from liquid crystal light valves 60B, 60G and 60R into liquid crystal light valve 100 through incident side lenses 370B, 3700 and 370R, light-synthesizing cross dichroic prism 80 and so forth.

Here, the optical path length of each colored light from the three liquid crystal light valves 60B, 60G and 60R to liquid crystal light valve 100 is designated as L1 (blue light), L2 (green light) and L3 (red light). For example, optical path length L1 of the blue light refers to the length of the light path from the display surface of liquid crystal light valve 60B to the display surface of liquid crystal light valve 100 though reflecting mirror 380B, relay lens 375B, reflecting mirror 385B and light-synthesizing cross dichroic prism 80. In projection-type display device 130, relay lenses 375B, 3750 and 375R and reflecting mirrors 380B, 380G, 380R, 385B, 3850 and 385R are arranged so that the three optical path lengths are roughly equal (L1=L2=L3).

Next, an explanation is provided of the overall flow of light transmission of projection-type display device 130. White light from light source 10 enters incident surface 300a of light-dividing or dichroic prism 300, and together with being divided into the three primary colors of red (R), green (G) and blue (B) by light-dividing cross dichroic prism 300, the blue light, green light and red light of the three primary colors of light into which the white light has been divided are radiated from second through fourth emergent surfaces 300b through 300d, respectively. The blue light, green light and red light radiated from second through fourth emergent surfaces 300b through 300d then enters liquid crystal light valves 60B, 60G and 60R (color modulation light valves), respectively.

Each colored light that has entered liquid crystal light valves 60B, 60G and 60R is color-modulated based on external data corresponding to the respective wavelength region, and is radiated as modulated light that has connoted an optical image. Each of the modulated light from liquid crystal light valves 60B, 60G and 60R enters first through third incident surfaces 80b through 80d of light-synthesizing cross dichroic prism 90 through incident side lenses 370B, 370G and 370R, reflecting mirrors 380B, 380G and 380R, relay lenses 375B, 375G and 375R and reflecting mirrors 385B, 385G and 385R arranged in each light path.

The three colors of light that have entered first through third incident surfaces 80b through 80d of light-synthesizing cross dichroic prism 80 are synthesizing into a single beam of light there and this single beam of light enters liquid crystal light valve 100 after passing through emergent side lens 95. The synthesized light that has entered liquid crystal light valve 100 is luminance-modulated based on external data corresponding to the entire wavelength region, and then radiated to projection section 110 as modulated light that ha connoted the final optical image. In projection section 110, the desired image is displayed by projecting the final synthesized light from liquid crystal light valve 100 onto a screen not shown.

In addition, although projection-type display device 130 has a display control device 200 (not shown) that controls liquid crystal light valves 60B, 60G and 60R and liquid crystal light valve 100 in the same manner as projection-type display device 1 in the aforementioned first embodiment, se its operation is the same as projection-type display device 1 in the aforementioned first embodiment, a description of its operation is omitted.

The following effects are demonstrated by projection-type display device 130 composed in the manner described above. Since a light-dividing cross dichroic prism 300 containing two types of dichroic films in the shape of an X-shaped cross-section is used for the optical separation unit, the distance between light source 10 and the three locations of liquid crystal light valves 60B, 60G and 60R can be set to be roughly equal, hereby allowing the entrance of illumination light in which the light intensity distribution is uniform into each liquid crystal light valve 60B, 60G and 60R that forms an image by optical modulation. As a result, luminance unevenness (which is ultimately perceived as color unevenness) that is likely to occur among the three liquid crystal light valves 60B, 60G and 60R can be decreased thereby allowing the formation of a high-quality.

In addition, since light-dividing cross dichroic prism 300 and light-synthesizing cross dichroic prism 80 are arranged in a positional relationship such that they are stacked in the direction of the Y axis, the optical path length from the thee liquid crystal light valves 60B, 60O and 60R to liquid crystal light valve 100 can be made to be equal for each colored light. As a result, optical images (light intensity distributions) formed with first optical modulation elements in the form of the three liquid crystal light valves 60B, 60G and 60R can be accurately and efficiently transmitted to a second optical modulation element in the form of liquid crystal light valve 100.

Furthermore, a transmission process between two optical modulation elements is susceptible to exacerbation of transmission accuracy due to the occurrence of optional aberration. It is therefore important to improve transmission accuracy and transmission efficiency by reducing any optical aberration that may occur by individually optimizing the materials, lens curves (including aspherical lenses and achromatic lens) and other optical characteristics of incident side lenses 370B, 370G and 370R, relay lenses 375B, 3750 and 375R and emergent side lens 95 as well as the material, dimensions and of light-synthesizing cross dichroic prism 80 by focusing on the fact that the glass and plastic used to compose prisms and lenses have wavelength dependency in their optical characteristics. Moreover, from the same point of view, each optical path length L1 through L3 may be set to be slightly mutually different.

Variation of Second Embodiment

Figure 18:
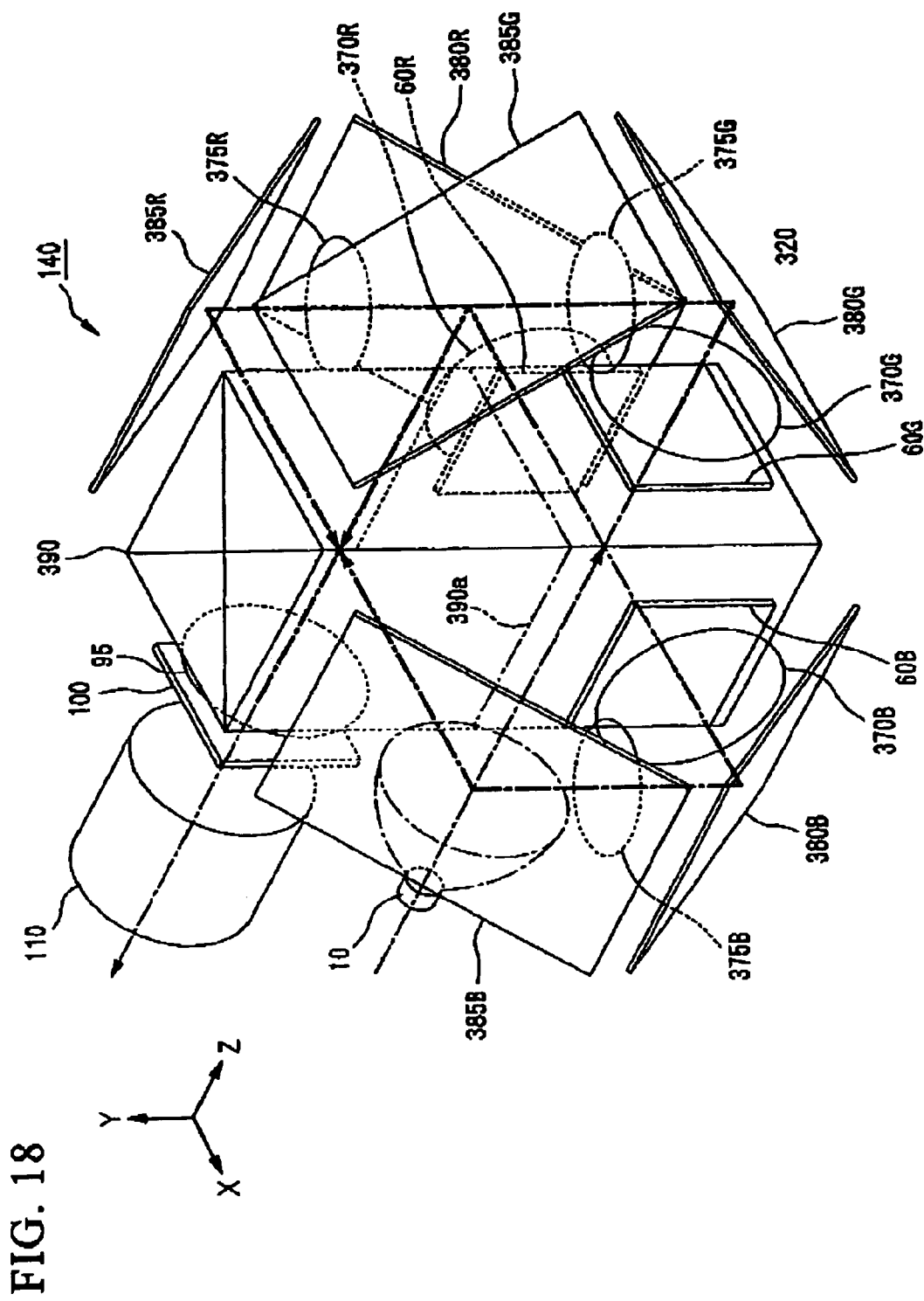
FIG. 18 is a drawing showing the main optical configuration of a projection-type display device 140 as claimed in the present invention.

The light-dividing cross dichroic prism and light-synthesizing cross dichroic prism of projection-type display device 130 explained in the second embodiment may also be integrated as in projection-type display device 140 of which the primary optical configuration is shown in FIG. 18. The two dichroic films contained in light-dividing cross dichroic prism 300 and light-synthesizing cross dichroic prism 80 of projection-type display device 130 have the same positional relationship when viewed along the direction of the Y axis. In other words, the blue light reflecting dichroic film in light-dividing cross dichroic prism 300 and the blue light reflecting dichroic film of light-synthesizing cross dichroic prism 80 lie roughly in the same plane, and this applies similarly for the red light reflecting dichroic films. Thus, light-dividing cross dichroic prism 300 and light-synthesizing cross dichroic prism 80 can be integrated in projection-type display device 130 to form light-dividing and light-synthesizing cross dichroic prism 390. As a result, the number of optical components can be decreased and the cost of the device can be reduced.

Other First Variation

Figure 20:
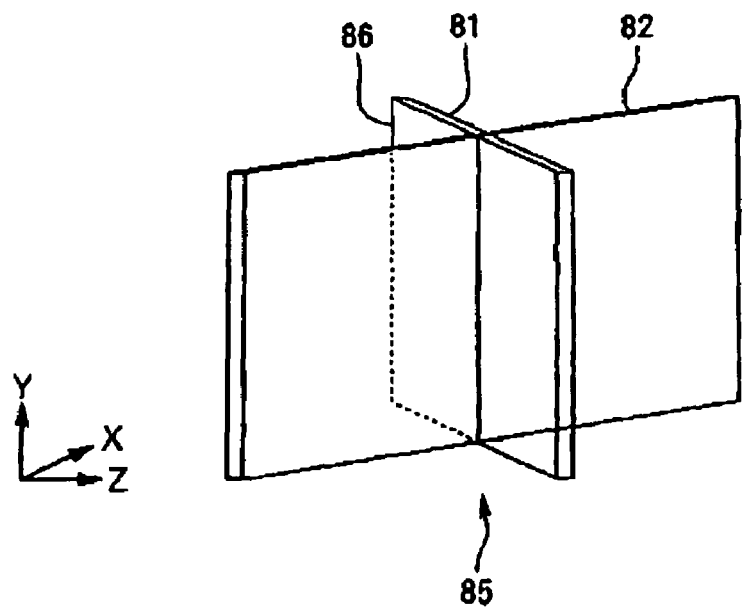
FIG. 20 is a drawing showing the constitution of a cross dichroic mirror 85.

Although the light synthesis unit was composed using a cross dichroic prism in the afore mentioned first embodiment, and the optical separation unit and light synthesis unit were composed using cross dichroic prisms in the aforementioned second embodiment, the present invention is not limited to this, but rather a cross dichroic mirror 85 as shown in FIG. 20 may be used instead of a cross dichroic prism. Cross dichroic mirror 85 is an optical element in which plate-like transparent media 86 such as glass or plastic are arranged in the shape of an X and on which are formed a blue light reflecting dichroic film 81 and a red light reflecting dichroic film 82, and basically has a function that is equivalent to that of a cross dichroic prism. As a result, the light synthesis unit and optical separation unit can be made to have a lighter weight and be composed less expensively as compared with the case of using a cross dichroic prism. Furthermore, cross dichroic mirror 85 may also be in the form of a cross dichroic mirror having a so-called liquid immersion structure in which am dichroic mirror 85 is arranged within a cube filled with a transparent liquid. In this case, optical performance equal to that of a cross dichroic prism can be realized less expensively than a cross dichroic prism.

Other Second Variation

Although liquid crystal light valves all of the same dimensions and shape (equal dimensions and shape of the display surface) were used for the first optical modulation elements in the form of liquid crystal light valves 60B, 60G and 60R (color modulation light valves) and the second optical modulation element in the form of liquid crystal light valve 100 (luminance modulation light valve) in the aforementioned first and second embodiments, the present invention is not limited to this. As shown in projection-type display device 150 shown in FIG. 21, for example, the dimensions of liquid crystal light valve 100 serving as a luminance modulation light valve of each projection-type display device in the aforementioned first and second embodiments may be composed so as to be smaller than the dimensions of the the liquid crystal light valves 60B, 60G and 60R serving as color modulation light valves. In this case, since the dimensions of the display surfaces of the color modulation light valves no longer match the dimensions of the display surface of the luminance modulation light valve if the resolution of the color modulation light valves is the same as the resolution of the luminance modulation light valve, it is necessary to change the size of the optical image in the transmission process to match the size of the luminance modulation light valve to which the optical image is transmitted.

According to projection-type display device 150 having a constitution as described above, since the size of projection lens 110 can be reduced corresponding to the reduction in size of the luminance modulation light valve, the effect is obtained by which the cost and weight of projection lens 110 can be reduced.

Furthermore, the dimensions of the luminance modulation light valve can be composed to be larger than the dimensions of the color modulation light valve opposite to that of projection-type display device 150. An example of providing such a constitution is described later.

Other Third Variation

Although the example of the case of the resolution of the first optical modulation elements in the form of liquid crystal light valves 60B, 60G and 60R (color modulation light valves) being higher than the resolution of the second optical modulation element in the form of liquid crystal light valve 100 (luminance modulation light valve) was explained in the aforementioned first embodiment, the resolutions of the two types of optical modulation elements (color modulation light valves and luminance modulation light valve) may be the same or different. However, in the case the resolutions are different, it is necessary to convert the resolution of display image data as was explained in the first embodiment.

For example, if the luminance modulation light valve has a display resolution that is higher than the display resolution of the color modulation light valves, since it is no longer necessary to set the modulation transfer function (MTF) higher in the transmission of light from the color modulation light valves to the luminance modulation lift valve, it is not necessary to make the transmission performance of the interposed relay optical system that high, thereby making it possible to compose the relay optical system comparatively inexpensively.

On the other hand, if the color modulation light valves have a display resolution that is higher than the display resolution of the luminance modulation light valve, since display image data is normally provided to match the display resolution of the color modulation light valves, resolution conversion processing is only required to be carried out once according to the display resolution of the luminance modulation light valve, thereby facilitating conversion processing of display image data.

Third Embodiment

Figure 22:
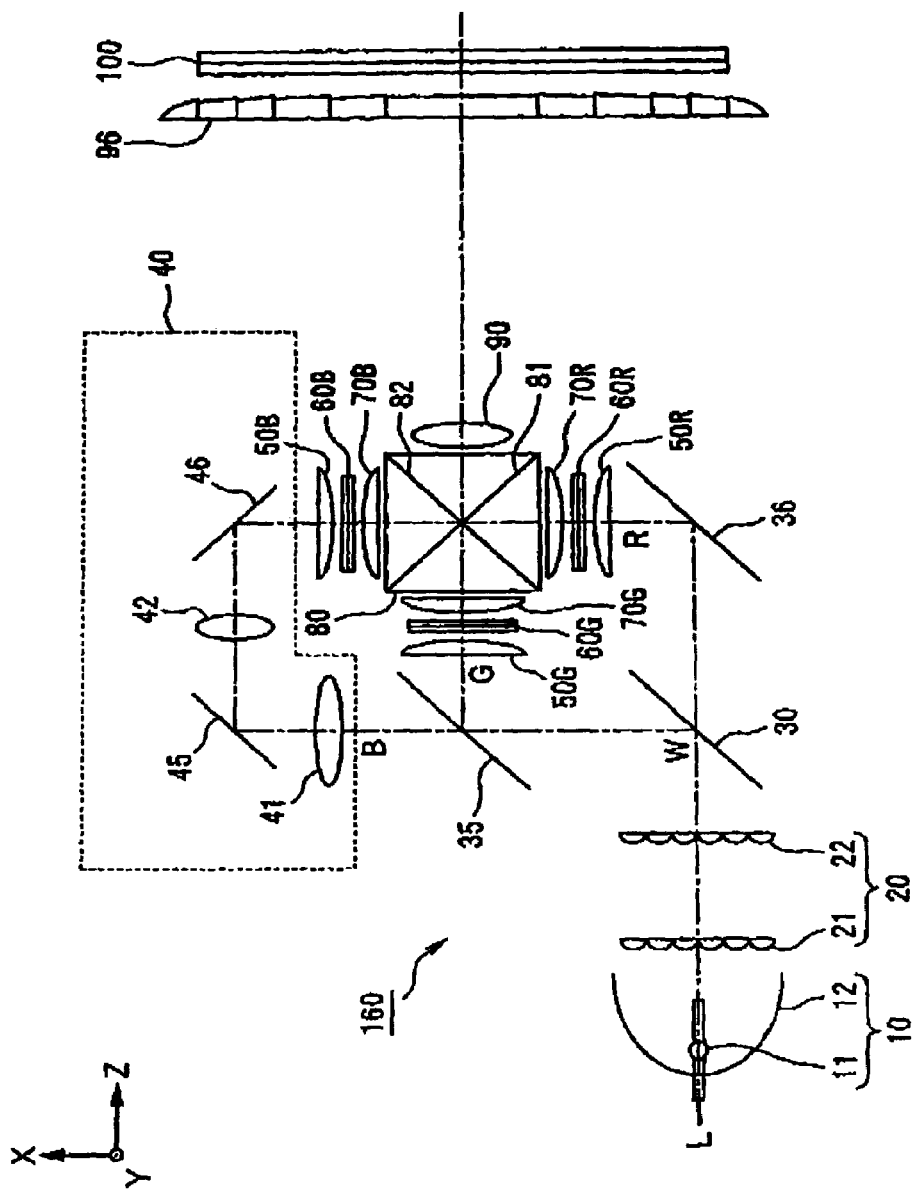
FIG. 22 is a drawing showing the main optical configuration of a liquid crystal display 160 as claimed in the present invention.

The contents of the present invention can also be applied to a so-called direct-view liquid crystal display device (optical display device) in which the final optical image (display screen) formed on the second optical modulation element is viewed directly without enlarging. Namely, as shown in FIG. 22, a liquid crystal display device (optical display device) 160 can be composed by excluding the projection lens 110 in each of the projection-type display devices explained in the aforementioned first and second embodiments. In this type of constitution, since the luminance modulation light valve serves as the image display screen in liquid crystal display device 166, a constitution in which its dimensions are larger and its resolution is higher than the color modulation light valves is preferable.

In liquid crystal display device 160, although it is necessary to increase the size of emergent side lens 95 to match the in increase size of the color modulation light valves, as shown in FIG. 22, increases in costs can be suppressed by using an emergent side lens 96 in the form of a Fresnel lens for emergent side lens 95.

In the aforementioned embodiments and variations, light source 10 shown in FIG. 1 corresponds to any of the light sources of the first through fourth aspect of the present invention, and projection lens 110 corresponds to the projection unit of the fourteen aspect of the present invention.

In addition, liquid crystal light valves 60B, 60G and 60R shown in FIGS. 1 and 3 correspond to any of the first optical modulation elements of the first, second, seventh and tenth through sixteenth aspect of the present invention, liquid crystal light valve 100 corresponds to any of the second optical modulation elements of the first, second, ninth, tenth and thirteenth through sixteenth aspect of the present invention, processing by which white light from light source 10 is resolved into colored light of the three primary colors or red, green and blue by dichroic mirrors 30 and 35, reflecting mirror 36 and relay optical system 40 corresponds to the optical separation suit of the second aspect of the present invention, incident side lenses 70B, 70G and 70R correspond to the first converging lenses of the seventh or eighth aspect of the present invention, and emergent side lens 95 corresponds to the second converging lens of the ninth aspect of the present invention.

In addition, light-synthesizing cross dichroic prism 80 shown in FIGS. 1 through 3 corresponds to any of the light synthesis units of the first, second and seventh aspect of the present invention.

In addition, light source 10 shown in FIGS. 17 and 18 corresponds to any of the light sources of the second, third and fourth aspect of the present invention, liquid crystal light valves 60B, 60G and 60R correspond to any of the first optical modulation elements of the second, third, seventh and tenth through sixteenth aspect of the present invention, incident side lenses 370B, 370G and 370R and relay lenses 375B, 375G and 375R correspond the first converging lenses of the seventh or eighth aspect of the present invention, reflecting mirrors 380B, 380G. 380R, 385B, 385G and 385R correspond to the light transmission unit of the third or fourth aspect of the present invention, emergent side lens 95 corresponds to the second converging lens of the ninth aspect of the present invention, liquid crystal light valve 100 corresponds to any of the second optical modulation elements of the second, sixth, ninth, tenth and thirteenth through sixteenth aspect of the present invention, and projection lens 110 corresponds to the projection unit of the seventeenth aspect of the present invention.

In addition, light-dividing cross dichroic prim 300 shown in FIG. 17 corresponds to any of the optical separation units of the second through fourth aspect of the present invention, and light-synthesizing cross dichroic prism 80 corresponds to any of the light synthesis units of the second through fourth aspect of the present invention.

In addition, light-dividing and light-synthesizing cross dichroic prism 390 shown in FIG. 18 corresponds to the optical separation unit and light synthesis unit of the sixth aspect of the present invention.

In addition, liquid crystal light valves 60B, 60G and 60R shown in FIG. 19 corresponds to any of the first optical modulation elements of the first, second, third, seventh and tenth through sixteenth aspect of the present invention, incident side tenses 70B, 70G and 70R correspond to the first converging lenses of the seventh or eighth aspect of the present invention, light-synthesizing cross dichroic prism 80 corresponds to any of the light synthesis units of the first, second and seventh aspect of the present invention, relay lens 90 corresponds to any of the relay lenses of the first second and seventh aspect of the present invention, emergent side lens 95 corresponds to the second converging lens of the seventh aspect of the present invention, liquid crystal light valve 100 corresponds to any of the second optical modulation elements of the first, second, ninth, tenth and thirteenth through sixteenth aspect of the present invention, and projection lens 110 corresponds to the projection unit of the seventeenth aspect of the present invention.

In addition, cross dichroic minor 85 shown in FIG. 20 corresponds to the cross dichroic mirror of the fifth aspect of the present invention.

Figure 21:
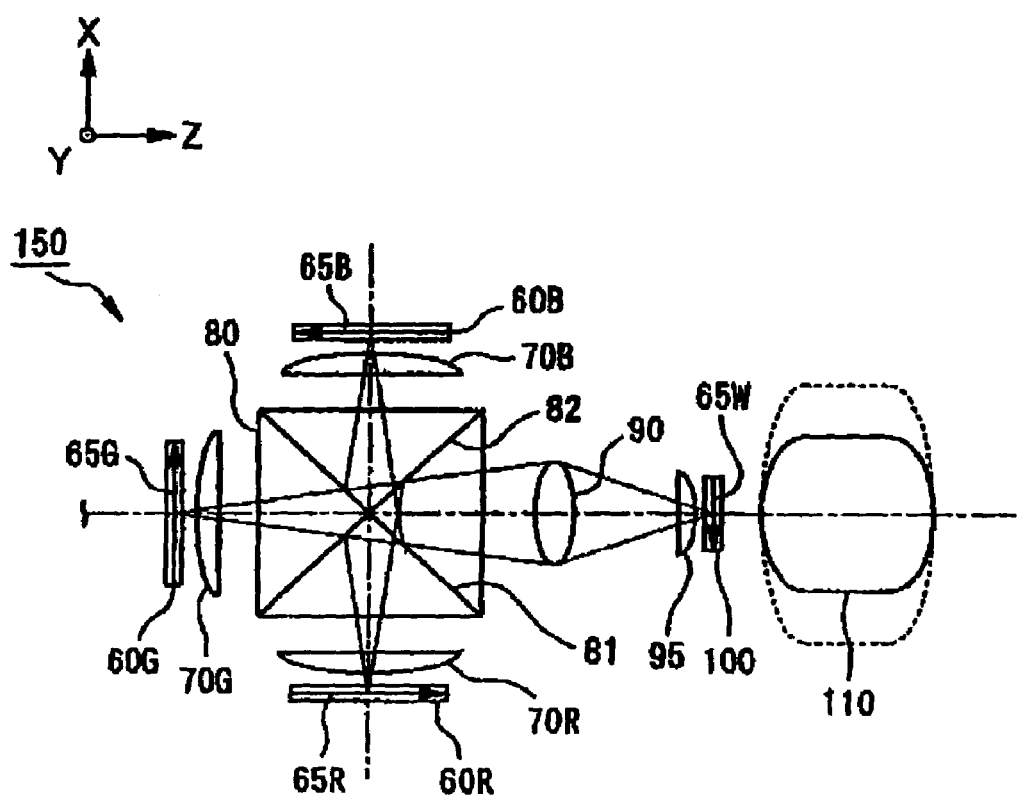
FIG. 21 is a drawing showing the main optical configuration of a projection-type display device 150 as claimed in the present invention.

In addition, liquid crystal light valves 60B, 60G and 60R shown in FIG. 21 correspond to any of the first optical modulation elements of the first, second, third, seventh and tenth through sixteenth aspect of the present invention, incident side lenses 70B, 70G and 70R correspond to the first converging lenses of the seventh or eighth aspect of the present invention, light-synthesizing cross dichroic prism 80 corresponds to any of the light synthesis units of the first, second and seventh aspect of the present invention, relay lens 90 corresponds to any of the relay lenses of the first, second and seventh aspect of the present invention, emergent side lens 95 corresponds to the second converging lens of the ninth aspect of the present invention, liquid crystal light valve 100 corresponds to any of the second optical modulation elements of the first, second, ninth, tenth and thirteenth through sixteenth aspect of the present invention, and projection lens 110 corresponds to the projection unit of the seventeenth aspect of the present invention.

In addition, light source 10 shown in FIG. 22 corresponds to any of the light sources of the first through fourth aspect of the present invention, liquid crystal light valves 60B, 60G and 60R shown in FIG. 21 correspond to any of the first optical modulation elements of the first, second, third, seventh and tenth through sixteenth aspect of the present invention, incident side lenses 70B, 70G and 70R correspond to the first converging lenses of the seventh or eighth aspect of the present invention, light-synthesizing cross dichroic prism 80 corresponds to any of the light synthesis units of the first, second and seventh aspect of the present invention, relay lens 90 corresponds to any of the relay lenses of the first, second and seventh aspect of the present invention, emergent side lens 96 corresponds to the second converging lens of the ninth aspect of the present invention and liquid crystal light valve 100 corresponds to any of the second optical modulation elements of the first, second, ninth, tenth and thirteenth though sixteenth aspect of the present invention.

In addition, an aspherical lens applied to a light transmission system composed by containing relay lens 90 and emergent side lens 95 as described in the text corresponds to the aspherical lens of the eleventh aspect of the present invention, and an achromatic lens applied to a light transmission system composed by containing relay lens 90 and emergent side lens 95 corresponds to the achromatic lens of the twelfth aspect of the present invention.

Furthermore, although constitutions were employed in the aforementioned embodiments such that optical luminance is modulated in two stages using a luminance modulation light valve and color modulation light valves, the present invention is not limited to this, but rather a constitution can also be employed in which optical luminance is modulated in two stages by using two sets of luminance modulation light valves.

In addition, although constitutions were employed in the aforementioned embodiments such that active matrix type liquid crystal display elements are used for liquid crystal light valves 60B, 60G, 60R and 100, the present invention is not limited to this, but rather a constitution may be employed in which passive matrix type liquid crystal display elements or segment type liquid crystal display elements are used for liquid crystal light valves 60B, 60G, 60R and 100. Active matrix type liquid crystal display element offer the advantage of enabling a precise gradation display, while passive matrix type liquid crystal display elements and segment type liquid crystal display elements offer the advantage of being able to be produced inexpensively.

In addition, although projection-type display devices 1, 130 and 150 and liquid crystal display device 160 are composed by providing transmitting optical modulation elements in the aforementioned embodiments, the present invention is not limited to this, but rather the luminance modulation light valve or color modulation light valves may be composed with reflecting optical modulation elements such as digital micromirror devices (DMD).

In addition, although the explanation of the aforementioned embodiment uses the case of executing a control program preliminarily stored in ROM 172 when carrying out the processing shown in the flow chart of FIG. 11, the present invention is not limited to this, but that program may be executed by loading into RAM 174 from a storage medium on which the program indicated in these steps has been stored.

Here, a storage medium refers to a semiconductor storage medium such as RAM or ROM, a magnetically storing storage medium such as FD or HD, an optically read storage medium such as a CD, CDV, LD or DVD, or a combination magnetically storing/optically read storage medium such as an MO, the reading method may be electrical, magnetic or optical, and all types of storage media are included provided it is a storage medium that can be read by a computer.

In addition, although a single light source that radiates white light is used for light source 10, and this white light is resolved into light of the three primary colors of red, blue and green in the aforementioned embodiments the present invention is not limited to this, but rather a constitution may be employed in which three light sources corresponding to each of the three primary colors of red, green and blue consisting of a light source that radiates red light, a light source that radiates blue light and a light source that radiates green light are used, and the unit for resolving the white light is omitted.

In addition, although primarily transmitting relay elements (lenses) as the relay optical system for forming an optical image of a front stage liquid crystal light valve on a rear stage liquid crystal light valve, the present invention is not limited to this, but rather primarily reflecting relay elements (mirrors) may also be used.

Figure 23:
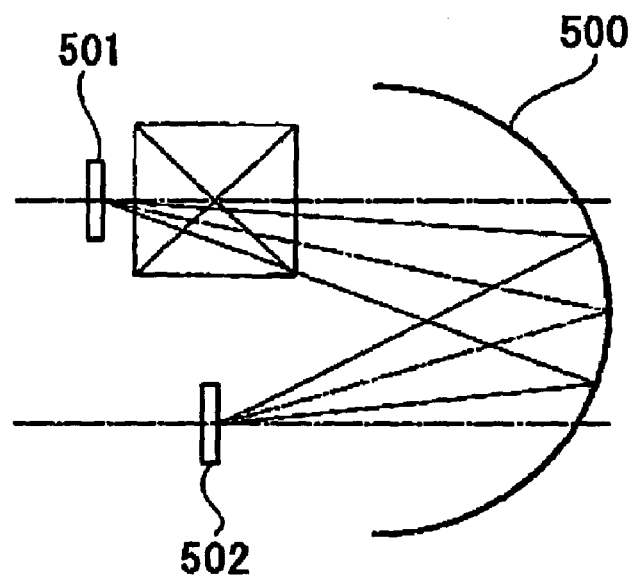
FIG. 23 is a drawing schematically showing an example of the constitution of a reflecting optical relay system composed of mirrors.
Figure 24:
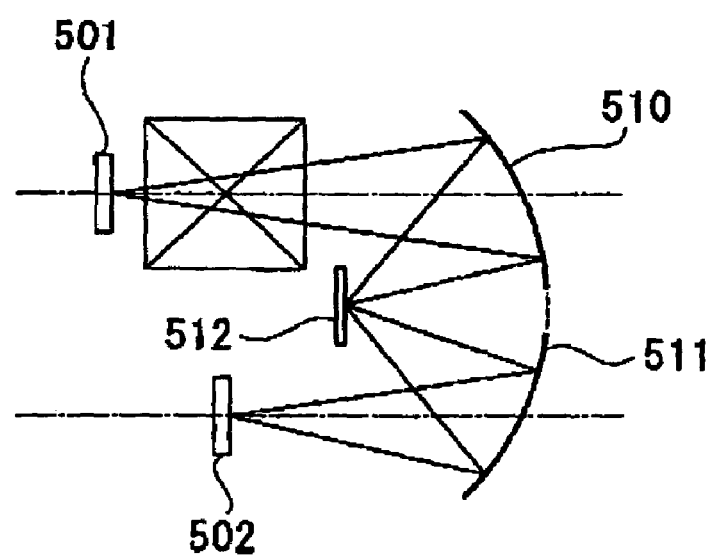
FIG. 24 is a drawing schematically showing an example of the constitution of a reflecting optical relay system composed of mirrors.
Figure 25:
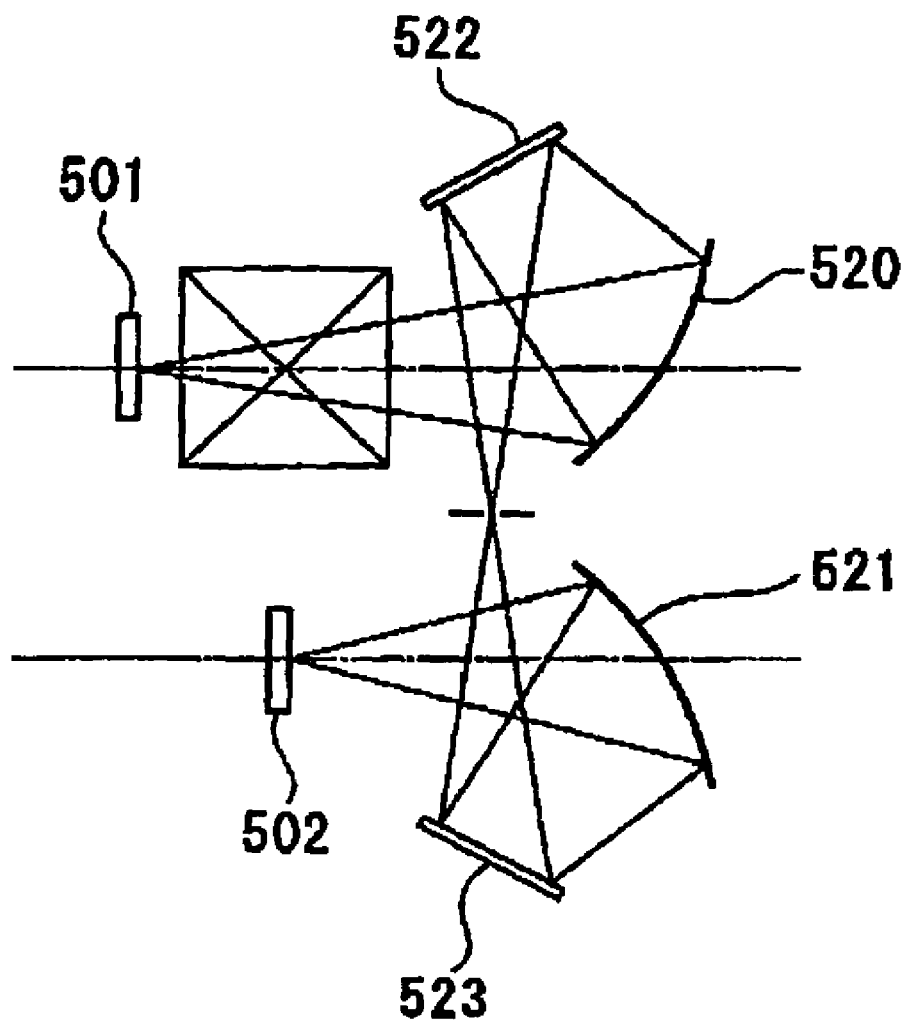
FIG. 25 is a drawing schematically showing an example of the constitution of a reflecting relay optical system composed of mirrors.

FIGS. 23 through 25 schematically show examples of the constitution of a reflecting relay optical system composed of mirrors.

The relay optical system of FIG. 23 is composed to form an optical image of a front stage light valve 501 on a rear stage light valve 502 through a single concave mirror 500. Namely, in this relay optical system, the image forming relationship (relationship in which two light valves 501 and 502 are nearly conjugated) is completed by a single reflection. Concave mirror 500 may be a spherical mirror or an aspherical mirror not having axial symmetry.

The relay optical systems of FIGS. 24 and 25 ace composed to complete an image forming relationship by multiple reflections to obtain a high image forming performance. In other words, in the relay optical systems of FIGS. 24 and 25, a plurality of reflecting optical elements (mirrors) are arranged on the light path to perform aberration correction, thereby improving the image forming performance of the relay optical system. In this case, as a result of containing flat mirrors, the degree of freedom of the layout is improved.

More specifically, the relay optical system of FIG. 24 has two concave mirrors 510 and 511, and a flat mirror 512 for guiding the reflected light of concave mirror 510 to concave mirror 511. A light bundle from front stage light valve 501 enters rear stage light valve 502 after being reflected in the order of concave mirror 510, flat mirror 512 and concave mirror 511. Furthermore, in this example, flat mirror 512 has the function equivalent to a stop. In addition, concave mirror 510 and concave mirror 511 may be integrally composed.

The relay optical system of FIG. 25 has two concave mirrors 520 and 521 and two flat mirrors 522 and 523. A light bundle from front stage light valve 501 enters rear stage light valve 502 after being reflected in the order of concave mirror 520, flat mirror 522, flat mirror 523 and concave mirror 521. A aperture may be arranged on the light path between flat mirror 522 and flat mirror 523.

This type of reflecting relay optical system is advantageous for reducing aberration (e.g., color aberration). Namely, the occurrence of aberration (e.g., color aberration) caused by the use of transmitting optical elements (lenses) is avoided in a reflecting relay optical system.

In addition, the relay optical system shown in FIGS. 24 and 25 have bilateral telecentricity as a result of using a plurality of mirror. Consequently, the brightness, tint, contrast and so forth of images formed on the surfaces of the rear stage light valve can be reliably made to be uniform, thereby resulting in satisfactory image display quality.

Furthermore, the use of a concave mirror or convex mirror (including aspheric mirrors for both) instead of flat mirrors in the relay optical systems of FIGS. 24 and 25 makes it possible to obtain a constitution in which image aberration can be corrected more easily.

In addition, mirrors of a form in which an aluminum, silver or other metal film is formed on a substrate, mirrors of a type having a reflective film composed of a dielectric multilayer film (high reflection film) or combinations of both types a applied for the mirrors used in the aforementioned reflecting relay optical systems. Reflective films composed of a dielectric multilayer film can be formed by, for example, alternately layering a high refractive index film and low refractive index film on a glass, silicon or other substrate to obtain a high reflection factor by utilizing the interference generated by the reflected light at the film boundaries.

While preferred embodiments of the invention have been described and illustrated above, it should be understood that these are exemplary of the invention and are not to be considered as limiting. Additions, omissions, substitutions and other modifications can be made without departing from the spirit or scope of the present invention. Accordingly, the invention is not to be considered as being limited by the foregoing description, and is only limited by the scope of the appended claims.

What is claimed is:

1. An optical display device that displays an image by modulating light from a light source based on display image data, comprising:
   an optical separation unit that divides light from the light source into light of a plurality of different specific wavelength regions, and that is composed of a prism having a polyhedron shape containing first through fourth side faces and in which a film is formed that reflects or transmits light of a specific wavelength region so as to divide light from the light source that has entered from the first side face into three different specific wavelength regions and radiate said resolved light from the second through fourth side faces;
   a plurality of first optical modulation elements that respectively control the light propagation characteristics of resolved light from the optical separation unit;
   a light synthesis unit that synthesizes light from the plurality of first optical modulation elements, and that is composed of a prism having a polyhedron shape containing first through fourth side faces and in which a film is formed that reflects or transmits light of a specific wavelength region so as to synthesize light that has entered from the second to fourth side faces and radiate said synthesized light from the first side face;
   a light transmission unit that is provided so as to transmit the resolved light respectively radiated from the second through fourth side faces of the optical separation unit to the second through fourth side faces of the light synthesis unit, and so that the optical path lengths of the three specific wavelength regions of resolved light are each equal or nearly equal;
   a second optical modulation element that controls the light propagation characteristics of the synthesized light synthesized by the light synthesis unit, the second optical modulation element including a plurality of pixels controlling the light propagation characteristics independently; and
   at least one relay element that transmits an optical image formed on the first optical modulation elements to the second optical modulation element, wherein,
   each of the optical separation unit and the light synthesis unit comprises a first dichroic film and a second dichroic film, the first dichroic film of the optical separation unit and the first dichroic film of the light synthesis unit are in substantially the same plane, and the second dichroic film of the optical separation unit and the second dichroic film of the light synthesis unit are in substantially the same plane.

2. A projection-type display device comprising an optical display device according to claim 1, and a projection unit that projects light output from said optical display device.

3. An optical display device that displays an image by modulating light from a light source based on display image data, comprising:

an optical separation unit that divides light from the light source into light of a plurality of different specific wavelength regions;

a plurality of first optical modulation elements that respectively control the light propagation characteristics of resolved light from the optical separation unit;

a light synthesis unit that synthesizes light from the plurality of first optical modulation elements;

a second optical modulation element that controls the light propagation characteristics of the synthesized light synthesized by the light synthesis unit, the second optical modulation element including a plurality of pixels controlling the light propagation characteristics independently; and at least one relay element that transmits an optical image formed on the first optical modulation elements to the second optical modulation element, wherein the optical separation unit and the light synthesis unit are composed of cross dichroic mirrors in which dichroic mirrors are composed to have an X-shaped cross-section, each of the optical separation unit and the light synthesis unit comprises a first dichroic mirror and a second dichroic mirror, the first dichroic mirror of the optical separation unit and the first dichroic mirror of the light synthesis unit are in substantially the same plane, and the second dichroic mirror of the optical separation unit and the second dichroic mirror of the light synthesis unit are in substantially the same plane.

4. An optical display device according to claim 3, wherein the optical separation unit has an incident surface into which light enters from the light source, and a plurality of emergent surfaces from which each of the resolved light radiates, the light synthesis unit has a plurality of incident surfaces corresponding to each of the emergent surfaces of the optical separation unit, and an emergent surface from which synthesized light radiates, and together with providing a light transmission unit so that resolved light radiated from the emergent surfaces of the optical separation unit is transmitted to the corresponding incident surfaces of the light synthesis unit for each emergent surface of the optical separation unit, and the optical path length of said resolved light is equal or nearly equal to the optical path length of other resolved light, the first optical modulation elements are arranged on each light path of the emergent surfaces of the optical separation unit and the incident surfaces of the light synthesis unit corresponding to said emergent surfaces.

5. A projection-type display device comprising an optical display device according to claim 3, and a projection unit that projects light output from said optical display device.

6. An optical display device that displays an image by modulating light from a light source based on display image data, comprising:

a plurality of first optical modulation elements that control the light propagation characteristics of light from the light source;

a light synthesis unit that synthesizes light from each of the first optical modulation elements;

converging lenses that are respectively provided between each of the first optical modulation elements and the light synthesis unit;

a second optical modulation element that controls the light propagation characteristics of the synthesized light synthesized by the light synthesis unit, the second optical modulation element including a plurality of pixels controlling the light propogation characteristics independently; and at least one relay element that transmits, in cooperation with the converging lenses, an optical image formed on the first optical modulation elements to the second optical modulation element.

7. An optical display device according to claim 6, wherein the converging lenses have respectively different characteristics for each of the specific wavelength regions of light.

8. A projection-type display device comprising an optical display device according to claim 6, and a projection unit that projects light output from said optical display device.

9. An optical display device that displays an image by modulating light from a light source based on display image data, comprising:

a plurality of first optical modulation elements that control the light propagation characteristics of light from the light source;

a light synthesis unit that synthesizes light from each of the first optical modulation elements;

a second optical modulation element that controls the light propagation characteristics of the synthesized light synthesized by the light synthesis unit, the second optical modulation element including a plurality of pixels controlling the light propogation characteristics independently; and at least one relay element that transmits an optical image formed on the first optical modulation elements to the second optical modulation element, wherein at least one aspherical lens is provided in the light path between the first optical modulation elements and the second optical modulation element.

10. An optical display device according to claim 9, wherein a relay optical system that contains the relay element has bilateral telecentricity.

11. A projection-type display device comprising an optical display device according to claim 9, and a projection unit that projects light output from said optical display device.

12. An optical display device that displays an image by modulating light from a light source based on display image data, comprising:

a plurality of first optical modulation elements that control the light propagation characteristics of light from the light source;

a light synthesis unit that synthesizes light from each of the first optical modulation elements;

a second optical modulation element that controls the light propagation characteristics of the synthesized light synthesized by the light synthesis unit, the second optical modulation element including a plurality of pixels controlling the light propogation characteristics independently; and at least one relay element that transmits an optical image formed on the first optical modulation elements to the second optical modulation element, wherein at least one achromatic lens is provided in the light path between the first optical modulation elements and the second optical modulation element.

13. A projection-type display device comprising an optical display device according to claim 12, and a projection unit that projects light output from said optical display device.

14. An optical display device that displays an image by modulating light from a light source based on display image data, comprising:

a plurality of first optical modulation elements that control the light propagation characteristics of light from the light source;

a light synthesis unit that synthesizes light from each of the first optical modulation elements;

a second optical modulation element that controls the light propagation characteristics of the synthesized light synthesized by the light synthesis unit; and at least one relay element that transmits an optical image formed on the first optical modulation elements to the second optical modulation element, wherein the first optical modulation elements have a display resolution that is higher than the display resolution of the second optical modulation element.

15. A projection-type display device comprising an optical display device according to claim 14, and a projection unit that projects light output from said optical display device.

16. An optical display device that displays an image by modulating light from a light source based on display image data, comprising:

a plurality of first optical modulation elements that control the light propagation characteristics of light from the light source;

a light synthesis unit that synthesizes light from each of the first optical modulation elements;

a second optical modulation element that controls the light propagation characteristics of the synthesized light synthesized by the light synthesis unit; and at least one relay element that transmits an optical image formed on the first optical modulation elements to the second optical modulation element, wherein the dimensions of display surfaces of the first optical modulation elements are larger than the dimension of a display surface of the second optical modulation element.

17. A projection-type display device comprising an optical display device according to claim 16, and a projection unit that projects light output from said optical display device.

18. An optical display device that displays an image by modulating light from a light source based on display image data, comprising:

a plurality of first optical modulation elements that control the light propagation characteristics of light from the light source;

a light synthesis unit that synthesizes light from each of the first optical modulation elements;

a second optical modulation element that includes a plurality of pixels and controls the light propagation characteristics of the synthesized light synthesized by the light synthesis unit; and at least one relay element that provides an optical image from the first optical modulation elements onto the second optical modulation element, wherein the dimension of a display surface of the second optical modulation element is larger than the dimensions of display surfaces of the first optical modulation elements.

19. A projection-type display device comprising an optical display device according to claim 18, and a projection unit that projects light output from said optical display device.

* * * * *